US012600367B1

(12) United States Patent
Garg et al.

(10) Patent No.: US 12,600,367 B1
(45) Date of Patent: Apr. 14, 2026

(54) DETERMINING POINT LOCATIONS BASED ON ROAD SEGMENT APPROXIMATIONS

(71) Applicant: Zoox, Inc., Foster City, CA (US)

(72) Inventors: Lakshay Garg, Palo Alto, CA (US); Joona Markus Petteri Kiiski, Cupertino, CA (US)

(73) Assignee: Zoox, Inc., Foster City, CA (US)

( * ) Notice: Subject to any disclaimer, the term of this patent is extended or adjusted under 35 U.S.C. 154(b) by 465 days.

(21) Appl. No.: 18/112,231

(22) Filed: Feb. 21, 2023

(51) Int. Cl.
| | |
|---|---|
| *B60W 50/06* | (2006.01) |
| *B60W 30/09* | (2012.01) |
| *G01C 21/32* | (2006.01) |
| *G01C 21/34* | (2006.01) |

(52) U.S. Cl.
CPC ............ *B60W 50/06* (2013.01); *B60W 30/09* (2013.01); *G01C 21/32* (2013.01); *G01C 21/3461* (2013.01); *B60W 2050/065* (2013.01); *B60W 2554/802* (2020.02); *B60W 2556/40* (2020.02)

(58) Field of Classification Search
None
See application file for complete search history.

(56) References Cited

U.S. PATENT DOCUMENTS

| | | | |
|---|---|---|---|
| 10,217,232 B2 | 2/2019 | Harada | |
| 10,649,459 B2 | 5/2020 | Wang | |
| 10,670,725 B2 | 6/2020 | Tisdale et al. | |
| 10,671,075 B1 | 6/2020 | Kobilarov | |
| 10,789,487 B2 * | 9/2020 | Mittal | ................... G06T 11/203 |
| 10,831,210 B1 * | 11/2020 | Kobilarov | ......... B60W 60/0013 |
| 11,661,076 B1 * | 5/2023 | Garg | ....................... G06F 18/22 |
| | | | 701/23 |
| 2019/0071013 A1 * | 3/2019 | Adam | ................... B60W 50/16 |
| 2020/0142417 A1 | 5/2020 | Hudecek | |
| 2020/0240794 A1 | 7/2020 | Prasser et al. | |
| 2020/0398833 A1 * | 12/2020 | Hudecek | ............. B60W 60/001 |
| 2021/0020045 A1 * | 1/2021 | Huang | ................... G05D 1/692 |
| 2022/0198198 A1 | 6/2022 | Marcotte | |

(Continued)

OTHER PUBLICATIONS

Office Action for U.S. Appl. No. 18/112,175, dated Jun. 25, 2025, 36 Pages.

(Continued)

*Primary Examiner* — Jennifer M Anda
(74) *Attorney, Agent, or Firm* — Lee & Hayes, P.C.

(57) ABSTRACT

Techniques for transforming an object location from a first frame of reference to a route-relative frame of reference. A road management component may receive sensor data captured from sensor devices of a vehicle. The road management component may analyze the sensor data to determine a location of an object within the environment. The road management component may utilize a discretized map to determine a cell associated with the object location. Upon identifying the cell within which the object is located, the road management component may receive the list of road segments which may be proximate to the object. In such instances, the road management component may determine to which of the segments from the list of road segments the object is proximate. The road management component may determine how far along the reference line the object is positioned and/or how far away from the reference line the object is positioned.

20 Claims, 8 Drawing Sheets

(56) References Cited

U.S. PATENT DOCUMENTS

| | | |
|---|---|---|
| 2022/0262137 A1 | 8/2022 | Park |
| 2022/0281456 A1* | 9/2022 | Giovanardi ............ G06V 20/58 |
| 2023/0294692 A1 | 9/2023 | Ueyama et al. |
| 2024/0101106 A1* | 3/2024 | Blandizzi ........ B60W 60/00274 |
| 2024/0317218 A1* | 9/2024 | Bruno .................. B60W 30/08 |

OTHER PUBLICATIONS

Office Action for U.S. Appl. No. 18/112,175, Dated Dec. 17, 2024, Garg,"Determining Point Locations Based on Road Segment Approximations,"34 pages.

U.S. Appl. No. 17/089,443, filed Nov. 4, 2020, Garg, et al., "Techniques for Determining a Distance Between a Point and a Spiral Line Segment", 44 pages.

Office Action for U.S. Appl. No. 18/112,175, dated Oct. 8, 2025, 43 Pages.

* cited by examiner

500

800 ⟍

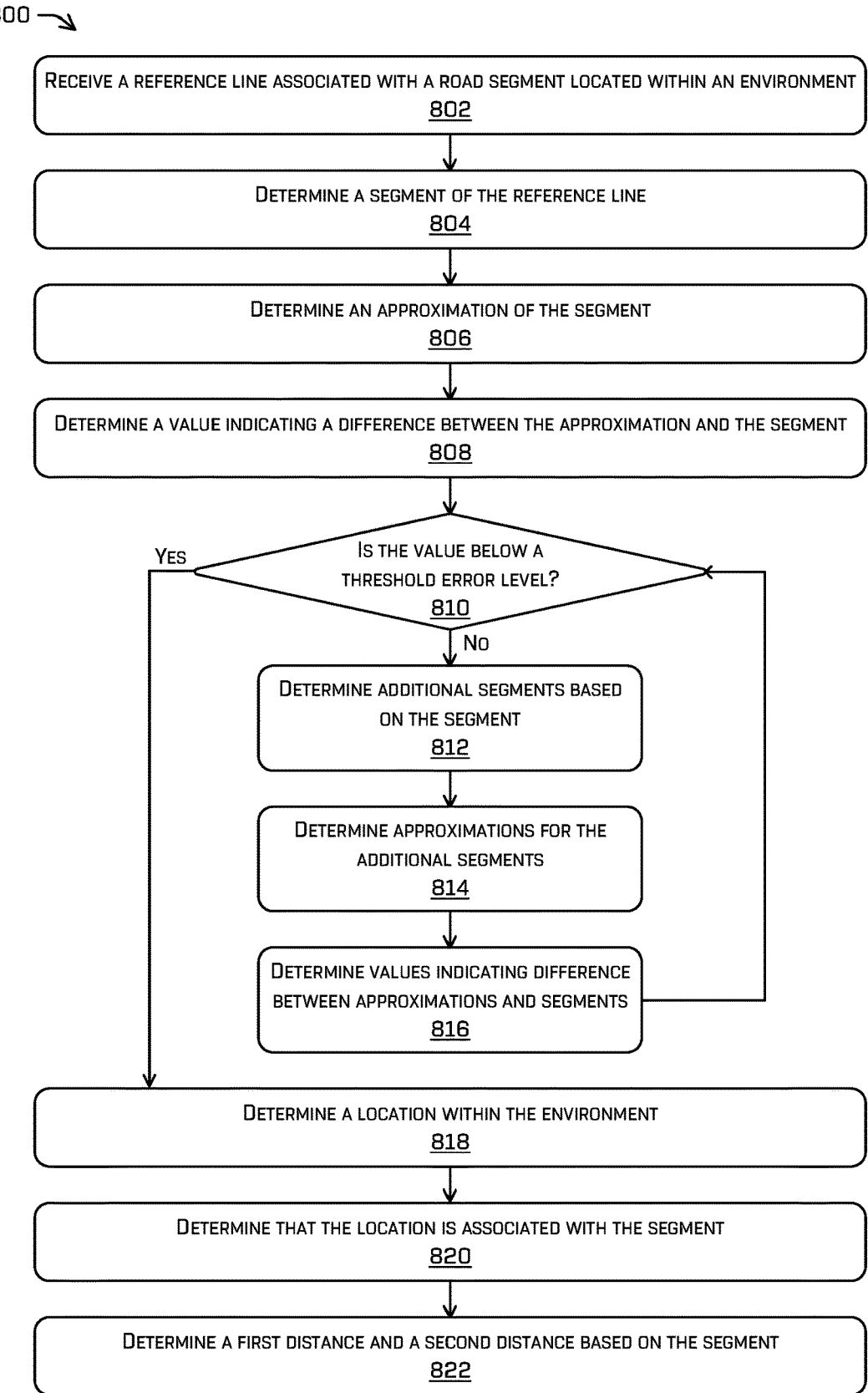

RECEIVE A REFERENCE LINE ASSOCIATED WITH A ROAD SEGMENT LOCATED WITHIN AN ENVIRONMENT
802

DETERMINE A SEGMENT OF THE REFERENCE LINE
804

DETERMINE AN APPROXIMATION OF THE SEGMENT
806

DETERMINE A VALUE INDICATING A DIFFERENCE BETWEEN THE APPROXIMATION AND THE SEGMENT
808

YES          IS THE VALUE BELOW A
THRESHOLD ERROR LEVEL?
810

NO

DETERMINE ADDITIONAL SEGMENTS BASED
ON THE SEGMENT
812

DETERMINE APPROXIMATIONS FOR THE
ADDITIONAL SEGMENTS
814

DETERMINE VALUES INDICATING DIFFERENCE
BETWEEN APPROXIMATIONS AND SEGMENTS
816

DETERMINE A LOCATION WITHIN THE ENVIRONMENT
818

DETERMINE THAT THE LOCATION IS ASSOCIATED WITH THE SEGMENT
820

DETERMINE A FIRST DISTANCE AND A SECOND DISTANCE BASED ON THE SEGMENT
822

FIG. 8

DETERMINING POINT LOCATIONS BASED ON ROAD SEGMENT APPROXIMATIONS

BACKGROUND

When navigating an environment, it is important for a vehicle to determine a distance between a location of an object within the environment and a location along a road segment where the vehicle is navigating. For instance, the vehicle may use the distance to determine one or more actions for the vehicle to perform, such as to continue navigating along a trajectory of the vehicle or yield to the object. However, in many cases, techniques for determining such a distance may be suboptimal and can result in excessive computations and/or delayed results, making these techniques unsuitable for real-time computation.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 8 is a flow diagram illustrating an example process for receiving a reference line, segmenting the reference line, approximating the segment, and using the approximation to determine distances associated with an object relative to the reference line, in accordance with one or more examples of the disclosure.

DETAILED DESCRIPTION

Figure 1:
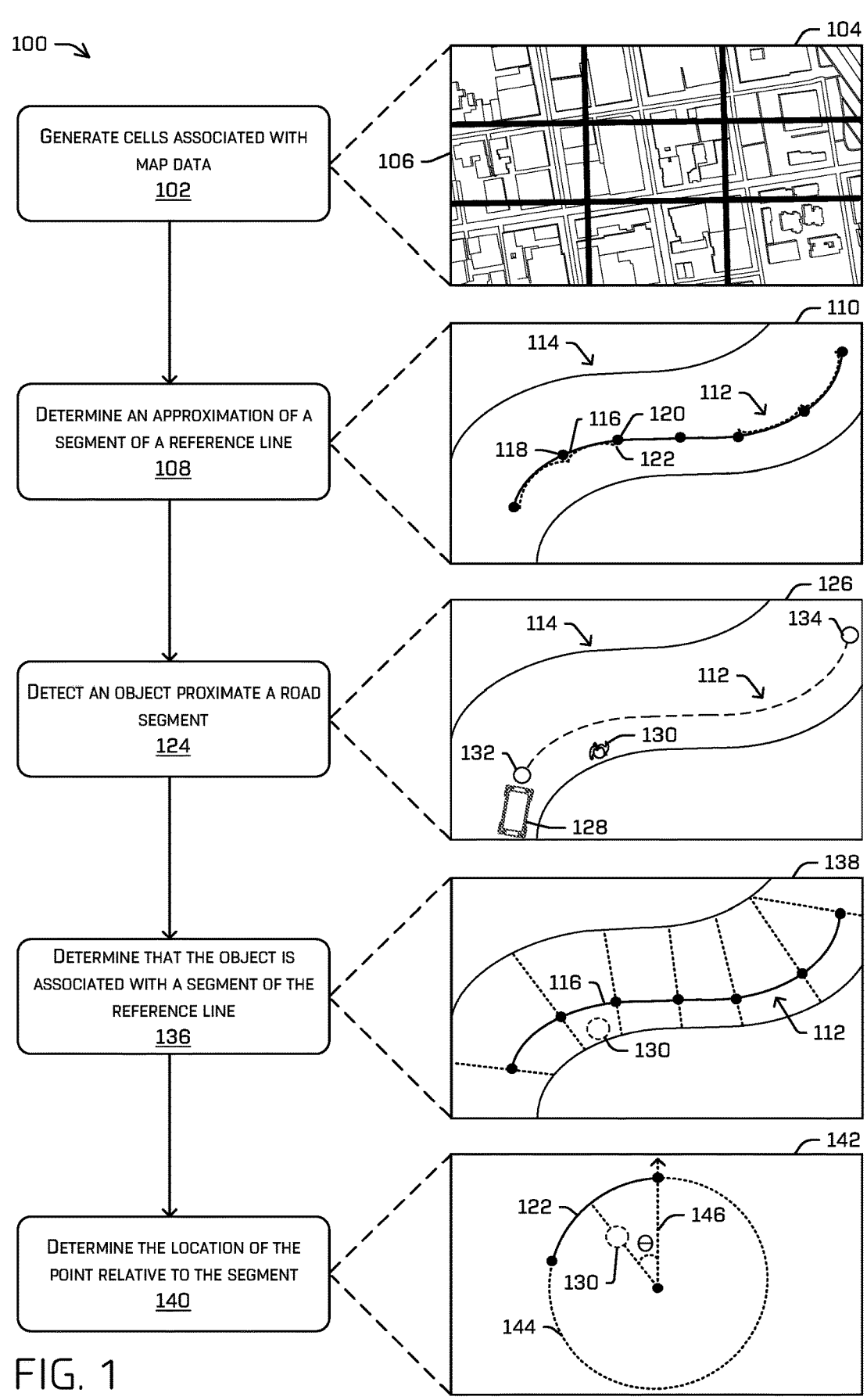
FIG. 1 is a pictorial flow diagram illustrating an example technique for determining a distance between a point within an environment and a reference line, in accordance with one or more examples of the disclosure.

As discussed above, determining a location of an object in an environment may be computationally expensive. For example, a vehicle may detect an object according to a cartesian coordinate system. In such examples, the vehicle may transform the object location from a cartesian coordinate frame of reference to a route-relative frame of reference (e.g., relative to a reference line), resulting in excessive computations and delayed results, making such techniques unsuitable for real-time computation.

Techniques for determining, in real-time, a location of a point relative to a line describing a portion of a road are discussed herein. As described herein, a segment of a reference line may be approximated to determine a location of a point relative to a distance along and/or from the reference line. In some examples, a road management component may receive map data representing an environment. The road management component may discretize the map data by generating multiple cells representing regions of the environment. In such instances, cells may include a list of the road segments that exist with the individual cells. Further, the road management component may receive a reference line that represents a road for which a vehicle may use to navigate. In some examples, such as when the road includes one or more curves, the reference line may comprise at least a portion of a spiral, clothoid, Bezier curve, or similar representation.

In some examples, the road management component may segment the reference line and determine one or more approximations of the segments. For example, the road management component may determine multiple segments of the reference line and approximate such segments with circular arcs, straight lines, or other representation which is able to be computed with low computational resources. The road management component may ensure that the approximations are sufficiently accurate representations of the reference line by performing testing operations configured to determine an error between the approximation and the segment and determining whether the error is below a threshold error. If the error meets or exceeds the threshold error, the road management component may determine additional segments and/or approximations and perform additional testing until the error between the approximation and the reference line is below the threshold error.

In some examples, the road management component may receive sensor data captured from sensor devices of a vehicle (such as an autonomous vehicle) while traversing within an environment. The road management component may analyze the sensor data to detect and/or identify a location (e.g., x-y coordinate) of an object within the environment. In some examples, the road management component may determine where the object is positioned relative to the vehicle and/or road. For example, the road management component may utilize the discretized map data to determine a cell associated with the object location. For example, the road management component may determine the cell the object is located within by comparing the x-y coordinate of the object with the x-y coordinates bounded by or contained with the cell. Upon identifying the cell within which the object is located, the road management component may receive the list of road segments which may be proximate to the object, which are referred to herein as candidate road segments. In such instances, the road management component may determine which of the one or more segments from the list of candidate road segments the object is proximate. Upon making such a determination, the road management component may determine how far along the reference line the object is positioned and/or how far away from the reference line the object is positioned (e.g., along a direction perpendicular to the approximation). As described in more detail below, the techniques may improve vehicle safety and driving efficiency by determining and/or using reference line approximations to efficiently transform an object location from a cartesian reference frame to a route-relative reference frame, thereby enabling the computing systems of the vehicle (e.g., road management component, planning component) to perform safer and more efficient driving maneuvers.

In some examples, an autonomous vehicle may navigate within an environment. For example, an autonomous vehicle may transport pedestrians and/or customers between pickup and drop off locations. While navigating the environment, the autonomous vehicle may receive sensor data, detect objects based on the sensor data, and/or generate trajectories based on detected objects. When detecting objects within the environment, the vehicle may determine a position of the object relative to the road upon which the vehicle is navigating.

When determining where an object is positioned relative to a road, conventional techniques may result in suboptimal and/or delayed results. For example, determining distances of a point (e.g., object) relative to a reference line (e.g., distance along the reference line; distance from the reference line) is critical to operation of an autonomous vehicle in an environment. For instance, the autonomous vehicle may use the distances to determine one or more actions for the autonomous vehicle to perform, such as to continue navigating along a trajectory of the autonomous vehicle or yield to the object. However, determining such distances may be computationally expensive when the point is in a cartesian frame of reference. For example, a vehicle may be navigating along a road segment that may be represented using multiple spirals, which may require complex computations to determine distances therefrom. Consequently, performing such determinations for each of the many objects detected within the environment may result in processing delays and errors in controlling the vehicle.

To address these and other technical problems and inefficiencies, the systems and/or techniques described herein include a road management system (which also may be referred to as a "road management component" or "road component") configured to determine distances between points within an environment and a reference line. Further, the road management component may approximate the reference line using circular arcs and/or straight lines, etc. and leverage such approximations to determine the distances described above. Technical solutions discussed herein solve one or more technical problems associated with conventional distance determining techniques resulting in processing delays, excessive amounts of required computational resources, and/or inaccurate vehicle actions.

Initially, a road management component may receive map data associated with an environment. In some examples, the road management component may receive and/or determine discretized map data during a pre-computation stage. For example, a pre-computation stage may be a moment in which the vehicle turns on, initializes, and/or any other situation. In some instances, the road management component may receive map data representing an environment. Map data may include information (e.g., static information) about the environment. Such information may include road information (e.g., road locations, road segment identifiers, reference line information (e.g., location, shape, length, curvature, angle, distances to the road border, etc.), object information (e.g., locations, object type, object identifier, etc.), and/or other types of information).

In some examples, the road management component may generate a discretized representation of the map data. The road management component may break down the map data into one or more cells representing regions of the environment. In some examples, the road management component may determine any number of cells having any dimension and/or size (e.g., 10×10 meters, 20×20 meters, 10×20 meters, etc.). The road management component may generate or otherwise determine the cells with reference to a global reference frame. As such, the location of each cell may be associated with an x-y coordinate or a range of x-y coordinates. For example, a cell may be represented as including a region of the environment spanning multiple x-coordinates and multiple y-coordinates. In some examples, as the cells represent and/or cover a region of the environment, such cells may include information about the objects and/or roads which are located within region of the environment covered by the cell. In such instances, a cell may have a cell identifier which corresponds to a list of the objects (e.g., located within the cell) and the associated object information. For example, a cell identifier may correspond to a list of road segments found within the region of covered by the cell. In some examples, the list of road segments may include a road segment identifier mapped to a geometry of the road segment (e.g., reference line, road boundary information, etc.), a location of the road segment, and/or any other information.

In some examples, the road management component may receive a reference line representing a road. A road may be represented and/or stored within map data as a reference line and/or a geometric polynomial that identifies one or more distances from the reference line to one or more borders of the road. In some instances, computing device(s) may generate the reference lines using at least line segments, circular arcs, and spirals. For example, the reference line may include one or more lines segments that include one or more lines, one or more circular arcs, and/or one or more spirals. Each reference line may include a first endpoint, such as a starting point, and a second endpoint, such as an ending point. Techniques for generating reference lines may be found, for example, in U.S. patent application Ser. No. 15/843,512 titled "Trajectory Generation Using Curvature Segments" and filed Dec. 15, 2017, and U.S. patent application Ser. No. 16/517,506, titled "Unstructured Vehicle Path Planner" and filed Jul. 19, 2019, which are incorporated by reference herein in their entirety.

In some examples, the road management component may determine multiple segments of the reference line. Based on the computational complexity of determining distances of a point relative to a road when the reference line is a spiral, the road management component may determine approximations of segments of the reference line with circular arcs, straight lines, or otherwise, as determining distances using such shapes (e.g., instead of a spiral) may reduce computational complexity and/or enhance computing speeds. In some examples, the road management component may break down the reference line by placing reference points at various locations along the reference line. For example, the road management component may place reference points at the start point and end point of the reference line. Further, the road management component may place reference points at locations of the reference line where two spiral sections connect, where the curvature of the reference line changes (e.g., positive to negative, zero to non-zero, non-zero to zero, etc.), where the border of the road changes (e.g., width, height, type, etc.), and/or any other location. A segment of the reference line may be defined by the portion of reference line between two consecutive reference points. Upon determining segments of the reference line, the road management component may approximate the segment using a circular arc or a straight line. The road management component may determine whether the approximation (e.g., circular arc or straight line) is a sufficiently accurate representation of the segment of the reference line.

In some examples, the road management component may determine whether the approximation is a sufficiently accurate representation of the segment. The road management component may ensure that the approximation is sufficiently accurate by determining an error (e.g., difference) between the segment and the approximation, and subsequently determining that the error is at or below a threshold error. For example, the road management component may identify one or more points within the environment (also referred to as a "test points"). Such test points may correspond to a location of the environment between the segment and the road boundaries. In some examples, the road management component may determine a first set of coordinates. Such coordinates may include a first distance indicating how far along the segment the test point is positioned and a second distance indicating how far away from the segment the test point is positioned (e.g., measured perpendicular to the segment). Further, the road management component may determine a second set of coordinates. Such coordinates may include a third distance indicating how far along the approximation (e.g., circular arc or line) the test point is positioned and a fourth distance indicating how far away from the approximation the test point is positioned (e.g., measured perpendicular to the approximation). The road management component may determine a first difference between the first distance (e.g., distance along the segment) and third distance (e.g., distance along the approximation), in addition to determining a second difference between the second (e.g., distance from the segment) and fourth distance (e.g., distance from the approximation). In some examples, the road management component may determine that the error between the segment and the approximation for the test point is the larger of the first or second differences. For example, the road management component may indicate that the error is based on larger value of the first difference and the second difference. In some instances, the road management component may perform such operations to one or more additional test points of the road segment. In such instances, the road management component may determine a plurality error values for each of a plurality of test points. The road management component may identify the largest error value of the plurality of errors and compare the largest error value with a threshold error. If the largest error value is below the threshold error, the road management component may determine that the approximation of the segment is sufficiently accurate. Conversely, if the largest error value meets or exceeds the threshold error, the road management component may determine additional segments (e.g., split the segment in a plurality of subsegments) and perform similar operations of the new subsegments and continue splitting the subsegments until the largest error value of the plurality of test points is below the threshold error. Upon determining that the approximation of the segment is sufficiently accurate, the road management component may store parameters of the approximation within one or more components of the vehicle (e.g., map data). For example, the road management component may store the approximation information with a reference line, such as a length and/or location of segments, a circle (e.g., circular arc) that approximates the segment, the parameters of the circle (e.g., radius, center point, etc.), and/or any other parameter.

In some examples, a road management component may detect an object within the environment. The road management component and/or any other component of a vehicle may receive sensor data captured by sensor devices of a vehicle traversing an environment. The vehicle may analyze such sensor data to detect objects within the environment. In some cases, the vehicle may identify an x-y coordinate representing the position of the object with respect to a local reference frame and/or global reference frame. In some examples, the road management component may determine which road(s) the object is associated with, how far along the road the object is position, and/or how far away from the road the object is positioned. The road management component may determine which road the object is associated with by identifying a list of candidate road segments based on determining within which cell of the discretized map data the object is located.

In some examples, the road management component may determine within which cell the object is located. The road management component may access the discretized map data and determine within which of the multiple cells the object is located. As described above, cells may cover a region of the environment, and as such may include a range of x-y coordinates. As such, the road management component may determine which cell (e.g., range of x-y coordinates) the x-y coordinate of the object falls within. Based on selecting or otherwise determining within which cell the object is located, the road management component may receive a list of road segments contained within the cell and/or associated with the cell identifier. In some examples, the road management component my determine which road segment(s) from the list of road segments the object is close to.

In some examples, the road management component may determine which road segment the object is associated with. The road management component may use a slab point location technique to determine, for each road within the cell, which road segment the object is close to. For example, the road management component may determine a polygon that outlines the road defined by the road segment. The road management component may determine polygons for some, or all, of the candidate road segments. In some examples, the road management component may input the x-y coordinate of the object into a slab point locator in addition to the multiple polygons and receive, as output, the polygon within which the object is located. As such, the road management component may identify which road segment the object is close to. Such operations may be performed for some or all roads exiting within the cell.

In some examples, the road management component may determine the position of the object relative to the road segment(s). Based on identifying the road segment(s) proximate the object, the road management component may receive and/or request the approximation information (e.g., determined during the pre-compute stage as described above) for the associated road segment. For example, the road segment may be stored within map data and/or any other database along with the information about the circular arc or straight line that approximates the road segment. As such, the road management component may retrieve, for some or all of the identified road segments, the approximation information in order to determine the position(s) of the object relative to the approximation(s) of the road segment(s). For example, the road management component may determine how far along the approximation (e.g., circular arc) the object is positioned and/or how far away from the road segment approximation the object is positioned (e.g., measured perpendicular to the circular arc).

In some instances, the road management component may use the distances and/or positions of the object to determine one or more actions for the autonomous vehicle to perform. For example, the vehicle may determine, based on the distances and/or position of the object, one or more costs associated with one or more trajectories that the autonomous vehicle may navigate. The vehicle may then select a trajectory based on the one or more costs. For example, the vehicle may select the trajectory that includes the lowest cost. Techniques for determining and using costs may be found, for example, in U.S. patent application Ser. No. 16/147,492, titled "Trajectory Generation and Optimization Using Closed-Form Numerical Integration in Route-Relative Coordinates" and filed Sep. 28, 2018, and U.S. patent application Ser. No. 16/179,679, titled "Adaptive Scaling in Trajectory Generation" and filed Nov. 2, 2018, which are incorporated by reference herein in their entirety.

The techniques described herein can improve the functioning, safety, and efficiency of the autonomous and semi-autonomous vehicles operating in various driving environments by using road segment approximations to determine object positions relative to a reference line. The use of road segment approximations may improve computational efficiency when determining distances of an object along and/or from a reference line. The improved computational efficiency can increase computing speeds which may enable the vehicle to receive distances and/or positions sooner, thereby enabling the vehicle to determine vehicle trajectories sooner.

The techniques described herein may be implemented in several ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In another example, the techniques may be utilized in an aviation or nautical context, or in any system evaluating distances between reference lines in an environment (e.g., in a system using route-relative planning). Additionally, the techniques described herein may be used with real data (e.g., captured using sensor(s)), simulated data (e.g., generated by a simulator), or any combination of the two.

FIG. 1 is a pictorial flow diagram illustrating an example process 100 for determining distances between points within an environment and a reference line. Some or all of the operations in process 100 may be performed by a road management component integrated within a perception component, a prediction component, a planning component, and/or other components and systems within an autonomous vehicle. For example, output, such as a cell, reference line, segment, approximation, and/or distance determined by the road management component may be provided as input to these and/or other components. In an additional or alternate example, the road management component may be integrated in a remote computing device.

At operation 102, the road management component may generate cells associated with map data. In some examples, a road management component may receive and/or discretize map data into one or more cells. Such cells may represent a region of the environment and include information about the objects and/or roads which are located therein. For example, box 104 illustrates map data discretized into multiple cells. In this example, the discretized map data 106 may illustrate a map of an environment. As shown, the environment may include one or more roads which may be utilized by a vehicle (e.g., autonomous vehicle). In this example, the discretized map data 106 may include nine cells; however, in other examples the discretized map 106 may include more or less cells covering larger or smaller regions of the environment. The cells of the discretized map 106 may be associated with an x-y coordinate or a range of x-y coordinates and have any number of sizes (e.g., 1 m, 10 m, 40 m, etc.). Further, some or all cells may include unique cell identifiers which may further be associated with various objects located within the cell. For example, and as shown in box 104, a cell may include zero or more roads therein, and such roads may have road identifiers. The one or more road identifiers may be mapped to a geometry of the road (e.g., reference line, road boundary information, segment information, approximation shape, approximation length, etc.), a location of the road segment, and/or any other information.

At operation 108, the road management component may determine an approximation of a segment of a reference line. A road may be represented and/or stored within map data as a reference line (e.g., a geometric polynomial, a spiral, a line, a combination thereof or of additional or alternate types of lines) that identifies one or more distances from the reference line to one or more borders of the road, lanes, or other portion of the drivable surface. In some examples, the road management component may receive reference lines, determine segments of the reference line, and/or approximate the segment using a circular arc or straight line. For example, box 110 may include a reference line broken down into multiple segments with associated segment approximations. In this example, the reference line 112 may represent the shape of the road 114. As such, the reference line 112 is shaped according to the spiral nature of the road 114. The reference line 112 may be broken down into one or more segments. In this example, the reference line 112 may include six segments that are determined based on the placement of the reference points. The reference points may be placed at various locations along the reference line 112, such as where two spiral sections connect, where the curvature of the reference line changes from a value to zero (or vice-versa), where the border of the road changes (e.g., width, height, type, etc.), where a distance between two reference points meets or exceeds a threshold distance, where a starting and/or ending point of the reference line 112 are located, at regular intervals along the line, any combination thereof, and/or any other location. As shown in box 110, one of the segments of the reference line 112 may include segment 116. Segment 116 may be defined as the portion of reference line 112 between a first reference point 118 and a second reference point 120. In this example, the road manager may determine an approximation 122 of the segment 116. As shown, the approximation is shaped as a circular arc; however, in other examples the approximation 122 may be shaped as a straight line. Further, in other examples the curvature and/or angle of the approximation 122 may differ.

In some examples, the road management component may ensure that the approximation 122 is sufficiently accurate by determining an error (e.g., difference) between the segment 116 and the approximation 122, and subsequently determine whether the error is at or below a threshold error. If the error meets or exceeds the threshold error, the road management component may determine additional segments and/or approximations and perform additional testing until the error between the approximation and the segment is below the threshold error. In some examples, the road management component may determine such approximations for some or all road segments within the environment. Additional details for approximating road segments (e.g., the scenario represented in box 110) are described with respect to FIGS. 2, 3, and 5.

At operation 124, the road management component may detect an object proximate a road segment. The road management component and/or any other component of the vehicle may receive sensor data captured by sensor devices of the vehicle traversing an environment. The vehicle may analyze the sensor data to detect objects. For example, box 126 illustrates a vehicle 128 navigating on a road 114 proximate an object 130. In this example, the vehicle 128 may be navigating along a road 114 that can be represented by a reference line 112. The reference line 112 may have a starting point 132 and an ending point 134. As shown, the vehicle 128 may be approaching an object 130. In this example, the object is a pedestrian; however, in other examples the object 130 may be an animal, a vehicle, a bicycle, a building, and/or any other object. The object 130 may include an x-y coordinate indicating where the object 130 is located with respect to a local and/or global reference frame. In some examples, the road management component may determine which road(s) the object 130 is associated with, how far along the road 114 (e.g., upon which the vehicle 128 is traversing) the object 130 is position, and/or how far away from the road the object 130 is positioned.

At operation 136, the road management component may determine that the object is associated with a segment of the reference line. In order to determine where the object 130 is positioned relative to a roadway, the road management component may receive a list of candidate road segments and use such candidate road segments to identify the road segment that the object 130 is associated with. The road manger may identify the list of candidate road segments by accessing the discretized map data (e.g., described in operation 102) and determine, based on the x-y coordinate of the object 130, within which cell the object 130 is located. In some examples, the road management component may receive the list of candidate road segments from the cell. Additional details for determining within which cell an object is located are described with respect to FIG. 4. Upon identifying the list of candidate road segments from the cell, the road management component may receive some or all of the road segments associated with the list of road segments and determine which segment the object 130 is closest to for each road within the cell. For example, box 138 illustrates multiple road segments that were located within the cell. In this example, the segment 116 of the reference line 112 may be located within the cell. The road management component may determine polygons for some or all of the candidate road segments that outline the road defined by the segment. As shown, the segment 116 may have dashed lines extending perpendicular from the reference points defining the segment 116. In this example, the width of the polygons extend to the border of the road; however, in other examples the width of the polygons may extend beyond the borders of the roads. A point slab locating component may input the polynomial and the x-y coordinate of the object 130 and output which polynomial the object is within, and thereby associated with which road segment. As shown, the object 130 is located within the polynomial defining the road based on the segment 116. Though not shown, the road management component may perform similar operations for some or all roads within the cell. For instance, the road management component may identify multiple roads within a cell and each road may be divided into multiple segments. In such instances, the road management component may determine, for each road, which segment of the road the object is closest to. As such, the road management component may identify a plurality of segments from a plurality of roads that are the closest to the object. In some instances, the road management component may determine a location of the object relative to each segment.

At operation 140, the road management component may determine the location of the object relative to the approximation. After identifying the segment 116 that is proximate to the object 130, the road management component may receive the approximation 122 of the segment 116. As described in operation 108, the approximation 122 for segment 116 may be a circular arc. The road management component may determine how far along the approximation 122 the object 130 is positioned and/or how far away from the approximation 122 the object 130 is positioned (e.g., measured perpendicular to the approximation 122). For example, box 142 illustrates using the approximation 122 of the segment 116 to determine the distances along and/or from the roadway. In this example, box 142 includes a circle 144 which may be associated with the approximation 122. The road management component may determine how far away from the approximation 122 the object 130 is by determining a first distance from the center of the circle to the object, and subtracting the distance from the known radius of the circle (e.g., which is a portion of the circular arc that approximates the segment). The road management component may determine how far along the reference line the object 130 is by determining a second distance indicating the distance of the object 130 along the reference line. For example, the road management component may identify a first line 146 that extends from the center of the circle perpendicular to the x-axis, and a second line that extends perpendicular from the approximation through the position of the object 130 to the center of the circle. The road management component may determine the arc length by determining an angle between the first line 146 and the second line and multiply the angle with the radius of the circle. In some examples, the road management component may use the arc length to determine the overall distance the object 130 is along the reference line. Specifically, the overall distance of the object 130 along the reference line may be determined by summing the approximation lengths of the segments between the start point and the segment 116 in addition to the determined portion of the approximation 122.

In some examples, the road management component may determine the locations of the object 130 relative to some or all of the segments identified by the point slab locating technique. In such instances, the road management component may send some or all of the locations to the vehicle 128. In some examples, the road management component may prioritize the values determined with respect to the road 114 upon which the vehicle 128 is travelling; however, in other examples the road management component may enable the vehicle and/or a teleoperation system determine which values to send to the vehicle 128.

Figure 2:
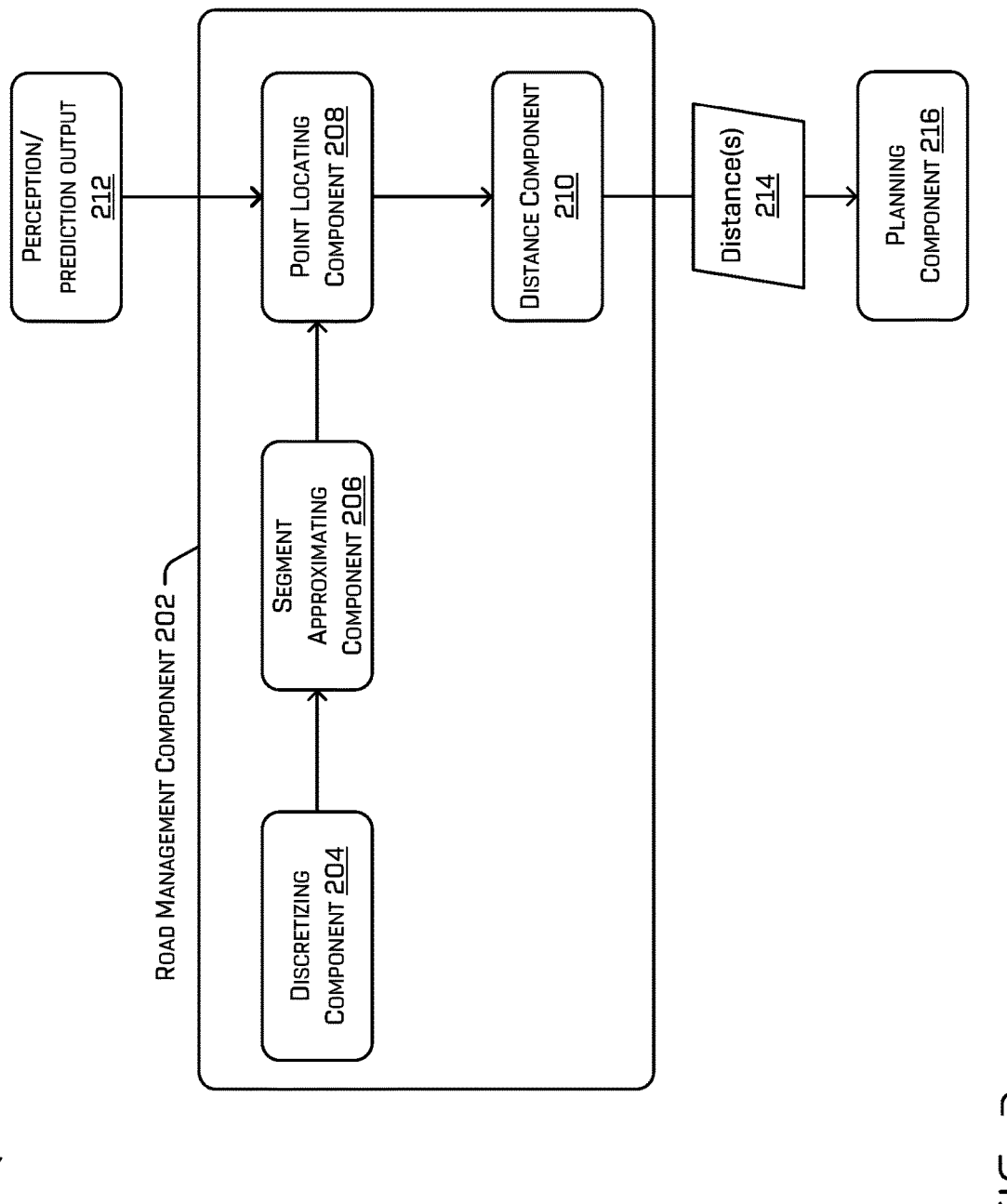
FIG. 2 illustrates an example computing system including a road management component configured to determine a distance of a point relative to approximation of a reference line, in accordance with one or more examples of the disclosure.

FIG. 2 illustrates an example computing system 200 including a road management component 202 configured to determine distances of a point relative to approximations of a reference line.

In some examples, the road management component 202 may be similar or identical to the road management component described above, or in any other examples herein. As noted above, in some cases the road management component 202 may be implemented within or otherwise associated with a perception component, a prediction component, and/or a planning component of an autonomous vehicle. In some examples, the road management component 202 may include various components, described below, configured to perform different functionalities of a road segment approximation technique. In some examples, the road management component 202 may include a discretizing component 204 configured to discretize map data into one or more cells, a segment approximating component 206 configured to determine approximations of segments of a reference line, a point locating component 208 configured to determine which road segment(s) a point (e.g., object) is associated with, and/or a distance component 210 configured to determine how far along the reference line the point is positioned and/or how far away from the reference line the point is positioned.

In some examples, the road management component 202 may include a discretizing component 204 configured to discretize map data into one or more cells. The discretizing component 204 may receive map data from one or more components of an autonomous vehicle and discretize the data into one or more cells which may represent one or more regions of an environment. The discretizing component 204 may perform such functions by a remote server-based system during a pre-computation stage and/or prior to the vehicle moving throughout the environment. A pre-computation stage may be a moment in which the vehicle turns on, initializes, and/or any other situation. Discretizing the map data during a pre-computation stage may enhance processing speeds, as the vehicle may not have to determine a discretize map data upon detecting each object. Rather, as the discretized map is determined offline, upon detecting an object, the vehicle may access the already discretized map data to determine within which cell the object is found, such as by storing the discretized map data in a memory of the vehicle or in a memory otherwise accessible to the vehicle (e.g., such as via a network connection).

In some examples, the discretizing component 204 may generate or otherwise discretize map data including one or more cells. A cell may represent a region of the environment. In some examples, the dimensions of the cells may be the same or different. In some examples, the cells may be associated with a range of x-y coordinates based on a local and/or global reference frame. For example, a cell may cover a region spanning multiple x-coordinates and multiple y-coordinates (e.g., cell coordinates include (0-5, 0-5)).

In some examples, the road management component 202 may include a segment approximating component 206 configured to determine approximations of segments of a reference line. The segment approximating component 206 may receive reference lines that represent roads within the environment, determine a segment of a road, determine an approximation of the segment, and ensure that the approximation is sufficiently accurate. For example, the segment approximating component 206 may receive a reference line and/or geometric polynomial that identifies one or more distances from the reference line to one or more borders of the road. In such examples, a reference line may include a first polynomial which indicates the breadth of the road to the border on one side of the reference line while including a second polynomial indicating the breadth of the road to the border on the other side of the reference line. Further, polynomials for a reference line may change at different locations along the reference line based on the breadth of the road changing.

In some examples, the segment approximating component 206 may determine one or more segments of the reference line. For example, the segment approximating component 206 may break down the reference line into segments which may be approximated by using circular arcs, straight lines, or otherwise. The segment approximating component 206 may place reference points at various locations of the reference line. A segment may be defined by the portion of the reference line between two consecutive reference points. The segment approximating component 206 may place the reference points where two spiral sections connect, where the curvature of the reference line changes (e.g., positive to negative, zero to non-zero, non-zero to zero, etc.), where the border of the road changes (e.g., width, height, type, etc.), where a distance between two consecutive reference points meets or exceeds a threshold distance, and/or any other location.

In some examples, the segment approximating component 206 may approximate the segments using circular arcs, straight lines, or otherwise. The segment approximating component may iterate through some or all of the segments to determine associated approximations. In some examples, the segment approximating component 206 may approximate the segment based on the curvature of the segment at the two reference points, curvature at a middle point of the segment, and/or a distance between the reference points. For example, the segment approximating component 206 may determine a curvature and/or angle of the segment at a first reference point and a curvature and/or angle of the segment at a second reference point. Further, the segment approximating component 206 may average the curvatures and/or angles to determine what size circle to use to approximate the segment. In other examples, the segment approximating component 206 may identify a center point of the segment and determine a curvature and/or angle values. In such instances, the segment approximating component 206 may use such values to estimate a shape of an approximation to place tangent to the segment.

In some examples, the segment approximating component 206 may determine whether the approximation is a sufficiently accurate representation of the segment. An approximation may be sufficiently accurate if, for one or more test points within the environment, the error between the segment and the approximation are at or below a threshold error. For example, the segment approximating component 206 may identify test points within the environment. The segment approximating component 206 may use test points from any location on the road and/or any location off the road. When performing the testing operations, the segment approximating component 206 may determine a first set of coordinates including a first distance indicating how far along the segment the test point is positioned and a second distance indicating how far away from the segment the point is positioned (e.g., measured perpendicular to the segment). Techniques for determining such distances of a point relative to a reference line may be found, for example, in U.S. application Ser. No. 17/089,443, titled "Techniques For Determining A Distance Between A Point And A Spiral Line Segment" and filed Nov. 4, 2020, which is incorporated by reference herein in its entirety and for any purpose. Further, the segment approximating component 206 may determine a second set of coordinates including a third distance indicating how far along the approximation (e.g., circular arc or line) the test point is positioned and a fourth distance indicating how far away from the approximation the test point is positioned (e.g., measured perpendicular to the approximation). Additional details for determining such distances relative to an approximation of a segment are described with respect to FIG. 3.

In some examples, the segment approximating component may determine an error associated with the approximation and the segment. For example, the segment approximating component 206 may determine a first difference between the first distance (e.g., distance along the segment) and third distance (e.g., distance along the approximation), in addition to determining a second difference between the second (e.g., distance from the segment) and fourth distance (e.g., distance from the approximation). In some examples, the road management component may determine that the error between the segment and the approximation for the test point is the larger of the first or second differences. The segment approximating component 206 may compare the error to a threshold error. If the error is at or below the threshold error, the segment approximating component 206 may determine that the approximation is sufficiently accurate. In such instances, the segment approximating component 206 may store information about the approximation (e.g., shape, size, curvature, radius, position, length, etc.) with the reference line and/or segment in one or more components of the autonomous vehicle. If the error meets or exceeds a threshold level, the segment approximating component 206 may determine that the approximation is not sufficiently accurate. In such instances, the segment approximating component 206 may split the segment into subsegments (e.g., creating two or more new segments), or otherwise, and perform similar testing operations until the errors between the approximation and the segment are below the error threshold. In some instances, the segment approximating component 206 may determine a minimum approximation and/or segment length. In such instance, the segment approximating component 206 may continue to divide the segment into subsegments until the approximation is sufficiently accurate or the approximation and/or segment have reached the minimum length.

In some examples, the road management component 202 may receive output 212 from a perception or prediction component of the autonomous vehicle. As shown in this example, the point locating component 208 may receive the output 212. The point locating component 208 may be configured to receive, store, synchronize, and/or analyze particular output 212 received from the component(s).

In some examples, the road management component 202 may include a point locating component 208 configured to determine which road segment(s) a point (e.g., object) is associated with. For some or all roads within a cell, the point locating component 208 may determine which segment of a particular road an object is closest to. The point locating component 208 may perform these operations for each road within a cell. In some examples, the point locating component 208 may identify a list of candidate road segments by determining within which cell of the discretized map data (e.g., determined by the discretizing component 204) the object is located. Additional details for determining which cell an object is associated with are described with respect to FIG. 4. Upon identifying the cell, the point locating component 208 may identify the list of candidate road segments. For example, the point locating component 208 may use the cell identifier to determine which road segment identifiers correspond thereto. The point locating component 208 may use a slab point locating technique to determine, for each road within the cell, which of the segments from the list of candidate road segments the object is close to. As described above, the point locating component 208 may determine a polygon that outlines the road defined by the segment and determine perpendicular lines within the polygon. In such instances, the point locating component 208 may determine within which polygon the object is located by determining between which grouping of lines perpendicular to the reference line the object is found. As described above, the point locating component 208 may perform such operations for some or all roads listed within the cell.

In some examples, the road management component 202 may include a distance component 210 configured to determine how far along a reference line the point is positioned and/or how far away from the reference line the point is positioned. As described above, the distance component 210 may determine such distances from some or all of the identified segments that were closest to the point for each road within the cell. The distance component 210 may determine a perpendicular distance away from the approximation using the stored information about the approximation. For example, the distance component 210 may use the approximation information to determine such a distance by determining first distance from the center of the circle to the object and subtracting the distance from the known radius of the circle. The distance component 210 may determine a second distance indicating the distance of the object along the reference line. For example, the distance component 210 may identify a first line that extends from the center of the circle perpendicular to the x-axis, and a second line that extends perpendicular from the approximation through the position of the object to the center of the circle. The distance component 210 may determine the angle between the first line and the second line and multiply the angle with the radius of the circle. In such instances, the result may provide a distance along the approximation which may be added to the known distance of the remainder of the reference line (e.g., for all preceding segments). In some examples, the distance component 210 may send the distances 214 to one or more planning component 216.

As shown in this example, the road management component 202 may send the distances 214 for further processing. In such examples, based on the road management component 202 having determined one or more distances 214 associated with a point, the road management component 202 may send the one or more distances 214 to one or more planning component 216. For example, a downstream planning component 216 may use the distances 214 to determine driving maneuvers to be performed by the autonomous vehicle.

Figure 3:
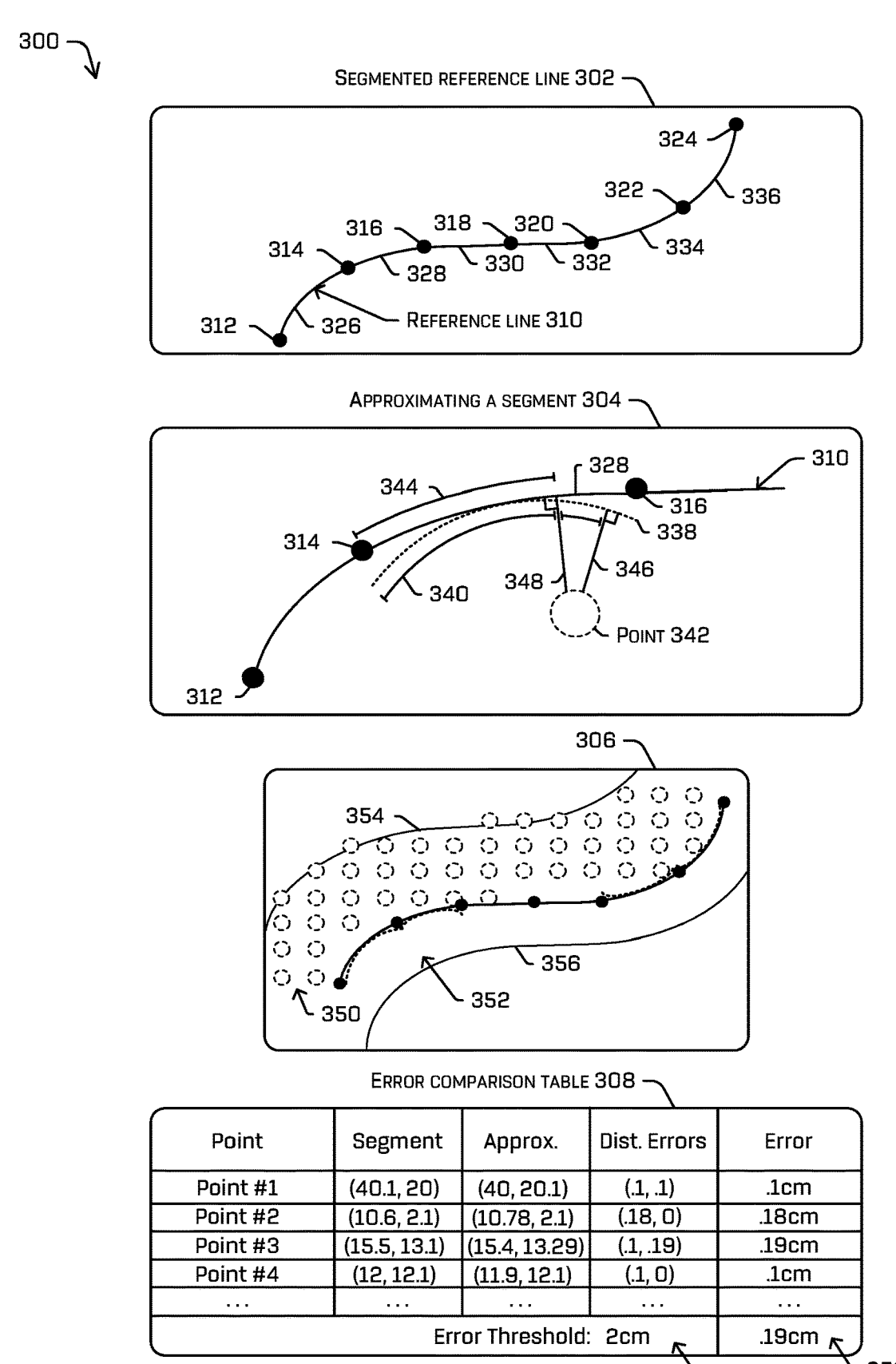
FIG. 3 depicts example operations for determining whether an approximation is sufficiently accurate, in accordance with one or more examples of the disclosure.

FIG. 3 depicts example operations 300 for determining whether an approximation is sufficiently accurate.

In some examples, the example operations 300 include four different boxes illustrating different aspects of the testing procedure. In this example, the first box 302 may be an illustration of a segmented reference line, the second box 304 may be an illustration of the various distances measured to determine the error between the approximation and the segment, the third box 306 may illustrate examples of the many possible testing points used to determine the errors between the approximation and the segment, and/or a fourth box 308 may illustrate and example table depicting the distances with respect to the approximation and the segment in addition to the associated error values.

In this example, the reference line described throughout FIG. 3 may be similar or identical to the reference line 112 of FIG. 1. As described above, the first box 302 may illustrate a segmented reference line. In this example, the first box 302 may include a reference line 310. The reference line 310 may include multiple reference points. For example, the reference line 310 may include a reference point 312, a reference point 314, a reference point 316, a reference point 318, a reference point 320, a reference point 322, and a reference point 324. As described above, such reference points may be placed where two spiral sections connect, where the curvature of the reference line 310 changes (e.g., positive to negative, zero to non-zero, non-zero to zero, etc.), where the border of the road changes (e.g., width, height, type, etc.), where a distance between two reference points meets or exceeds a threshold distance, where a starting and/or ending point of the reference line 310 are located, and/or any other location.

In some examples, the reference line 310 may include multiple segments. A segment may be a portion of the reference line 310 between two consecutive reference points. In this example, the reference line 310 may include a segment 326, a segment 328, a segment 330, a segment 332, a segment 334, and a segment 336. Segment 326 may be the portion of the reference line 310 between reference point 312 and reference point 314, segment 328 may be the portion of the reference line 310 between reference point 314 and reference point 316, segment 330 may be the portion of the reference line 310 between reference point 316 and reference point 318, segment 332 may be the portion of the reference line 310 between reference point 318 and reference point 320, segment 334 may be the portion of the reference line 310 between reference point 320 and reference point 322, and segment 336 may be the portion of the reference line 310 between reference point 322 and reference point 324.

In some examples, the second box 304 may be an illustration of the various distances that are compared to determine the error between an approximation and the segment. In this example, the second box 304 depicts determining an error with respect to an approximation 338 of the segment 328. For example, the second box may include a portion of the reference line 310. The second box 304 may include the reference point 312, the reference point 314, and the reference point 316. Further, the second box 304 includes the segment 328 with an associated approximation 338. In some instances, the approximation 338 may be a circular arc (e.g., a portion of a circle with a constant degree of curvature). As described above, when testing the approximation 338, the road management component may determine distances with respect to the approximation 338 and the segment 328. For example, the second box 304 may include a point 342 that may represent any type of object. Further, the second box 304 includes a first distance 340 that measures the distance from the reference point 314 to a location of the approximation 338 perpendicular to the point 342 (e.g., to distance 346). The second box 304 includes a second distance 344 that measures the distance from the start point to a location of the segment 328 perpendicular to the point 342. In some instances, the road management component may determine a difference (e.g., error) between the first distance 340 and the second distance 344. In this example, the second box 304 may include a third distance 346 that measures the distance between the approximation 338 and the point 342 (e.g., measured perpendicular to the approximation 338), and a fourth distance 348 that measures the distance between the segment and the point 342 (e.g., measured perpendicular to the segment 328). In some instances, the road management component may determine a difference (e.g., error) between the third distance 346 and a fourth distance 348. As described, the road management component may compare one or both of the errors with a threshold error to determine whether the approximation 338 is an accurate approximation of the segment 328.

As described above, the third box 306 may illustrate examples of the many possible testing points used to determine the errors between the approximation and the segment. In some examples, the road management component may perform the operations described above (e.g., FIGS. 1 and 2) in the second box 304 for any number of test points. For example, the third box 306 may include a road segment 352 with a first border 354 and a second border 356. In some examples, the third box 306 may include multiple test points 350 which may be located anywhere along the road segment 352. Such test points 350 may be located between the reference line 310 and the first border 354 and the second border 356. The road management component may determine one or more errors for each test point 350 and compare the largest error of the one or more errors with a threshold error.

As described above, the fourth box 308 may illustrate and example table depicting the distances with respect to the approximation and the segment in addition to the associated error values. The fourth box 308 may include column categories including point, segment, approximation, distance errors, and error. In this example, the point column may include multiple different test points 350 that have been tested. Further, the segment column indicates what the distances (e.g., as described above) were for the given point with respect to the segment. The approximation column indicates what the distances were for the given point with respect to the approximation. The distance errors column indicates the difference between the distances of the segment and the distances of the approximation. For example, point #1 has a distance error of (0.1, 0.1) based on taking the difference of the distances determined for the segment and approximation. The errors column indicates the largest error of the two errors provided in the distance errors column. For example, the error for point #1 is 0.1 cm, the error for point #2 is 0.18 cm, the error for point #3 is 0.19 cm, and the error for point #4 is 0.1 cm. As such, the overall error between the segment and the approximation may be the largest of the error values in the error column. In this example and as shown at the bottom of the table, the error 358 between the segment and the approximation is 0.19 cm. The road management component may compare the error 358 with an error threshold 360. In this case, the error threshold is 2 cm which is larger than the error 358. As such, the road management component may determine that the approximation is sufficiently accurate.

Figure 4:
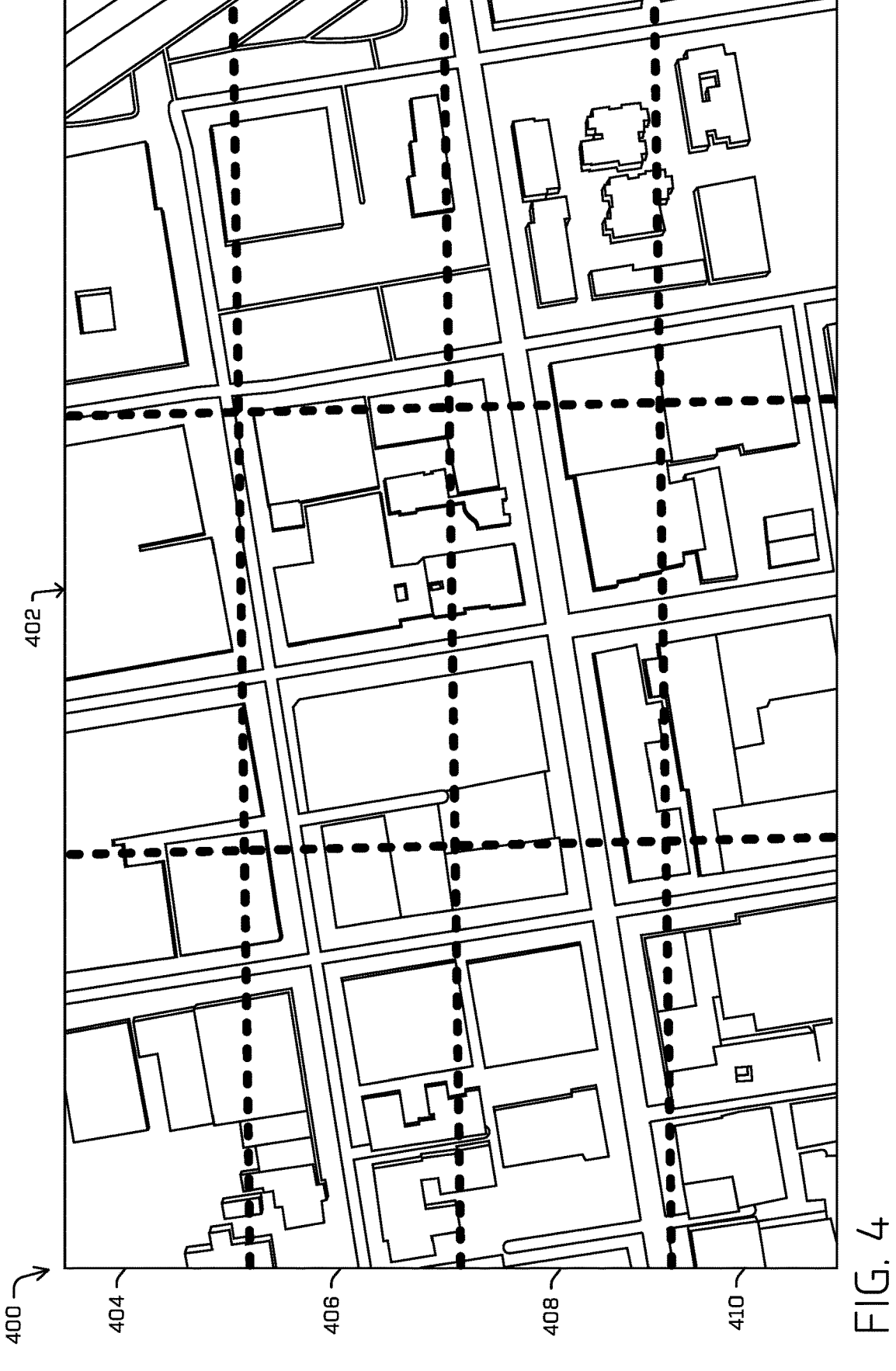
FIG. 4 depicts an example discretized map data, in accordance with one or more examples of the disclosure.

FIG. 4 depicts an example discretized map data 400. Specifically, FIG. 4 illustrates how map data may be discretized into cells that can later be used as a vehicle navigates within an environment to determine relative regions an object is located.

In some example, the discretized map data 400 may be similar or identical to the discretized map data of FIG. 1. As shown in FIG. 4, the discretized map data 400 may include a map 402 (e.g., map data) of an environment. The map 402 may include static information such as one or more roads, buildings, parking lots, and/or any other object. Further, the discretized map data 400 may include multiple cells which represent a region of the environment as provided by the map 402. For example, the discretized map data 402 may include a cell 404, a cell 406, a cell 408, a cell 410, in addition to many other cells. In some instances, the cells may be square or rectangular. The cells may include a range of x-y coordinates based on a global reference frame. For instance, the cell 410 may be associated with the x-y coordinates (0-5, 0-5), the cell 408 may be associated with the x-y coordinates (0-5, 5-10), the cell 406 may be associated with the x-y coordinates (0-5, 10-15), and the cell 404 may be associated with the x-y coordinates (0-5, 15-20). As such, a road management component may identify within which range of x-y coordinates objects fall to identify a list of candidate road segments. Of course this is merely an example, in other examples the discretized map may include more or less cells that cover different ranges.

Figure 5:
FIG. 5 depicts an example of approximating a segment of a reference line, in accordance with one or more examples of the disclosure.
Figure 5:
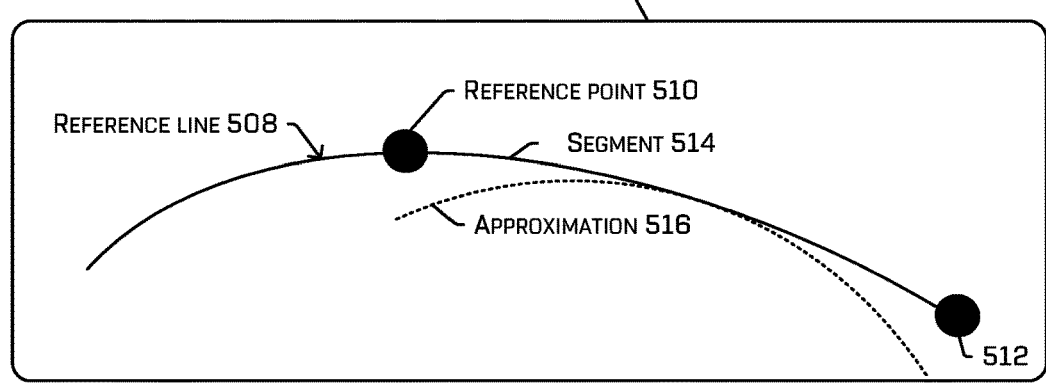
Figure 5:
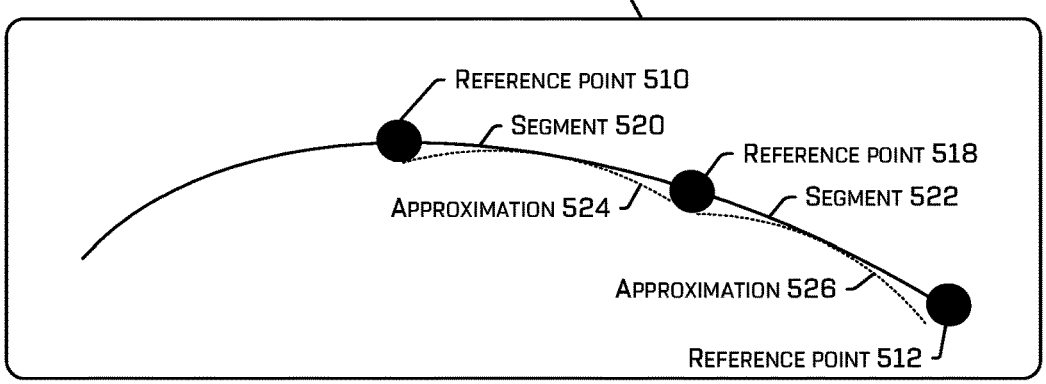
Figure 5:
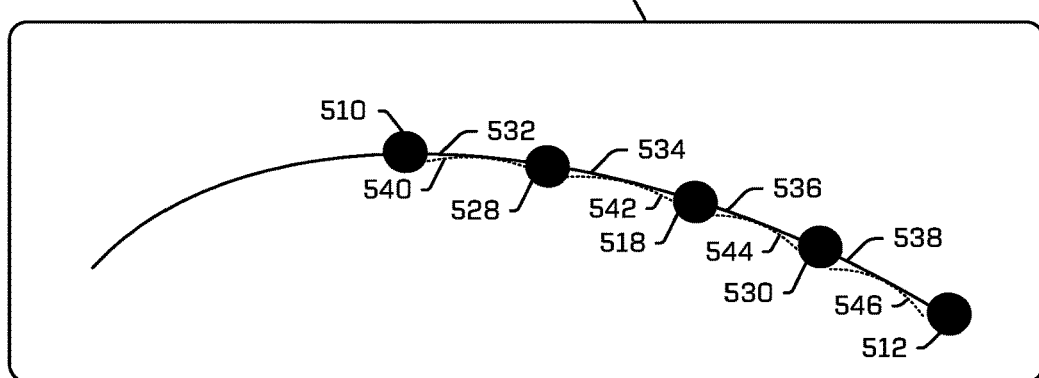

FIG. 5 depicts an example 500 of approximating a segment of a reference line. Specifically, FIG. 5 depicts how a reference line is segmented until such approximations are sufficiently accurate.

In this example, the example 500 may include three boxes that depict the flow of testing and further segmenting a reference line. For example, the first box 502 illustrates a first stage of segment approximation, the second box 504 illustrates the second stage of segment approximation, and the third box 506 illustrates the third stage of segment approximation. As shown, the first box 502 includes a reference line 508 with a reference point 510 and a reference point 512 which define a segment 514 of the reference line 508. In this example, the first box 502 includes an approximation 516 (e.g., an initial approximation) of the segment 514. In such instances, the approximation 516 may be a circular arc. As described above, a road management component may test the approximation 516 to determine whether it is sufficiently accurate. In the situation where the approximation 516 is not sufficiently accurate, the road management component may break the segment 514 in half (or otherwise), determine approximations for the new segments, and repeat the testing process.

In such instances, the second box 504 includes the reference line 508 broken down into additional segments based on the approximation 516 not be sufficiently accurate. In this example, the second box 504 includes the initial reference point 510 and the initial reference point 512, in addition to the newly placed reference point 518 used to further segment the reference line 508. Further, the second box 504 includes a segment 520 and a segment 522 which may be portions of the segment 514. In some examples, the second box includes an approximation 524 of the segment 520, and an approximation 526 of the segment 522. In some instances, the road management component may determine that the approximation 524 of the segment 520 and the approximation 526 of the segment 522 are both not sufficiently accurate and as such, the road management component may further break down the reference line 508. Of course, this is merely an example, in other examples one or more of the approximation 524 or the approximation 526 may be sufficiently accurate.

In such instances, the third box 506 includes the reference line 508 broken down into additional segments based on the approximation 524 and the approximation 526 not being sufficiently accurate. In this example, the third box 506 includes the initial reference point 510 and the initial reference point 512, in addition to the reference point 518 used to further segment the reference line 508 in the second box 504. Now, the third box 506 includes a reference point 528 and a reference point 530 which break the segment 520 and the segment 522 in half. The third box 506 includes a segment 532 and a segment 534 which are portions of the segment 520. Further, the third box 506 includes a segment 536 and a segment 538 which are portions of the segment 522. In some examples, the second box includes an approximation 540 of the segment 532, an approximation 542 of the segment 534, an approximation 544 of the segment 536, and an approximation 546 of the segment 538. In some instances, the road management component may determine that the approximations shown in the third box 506 are sufficiently accurate. As described above, this example is not intended to be limiting, in other examples the segments may be divided more or less times.

Figure 6:
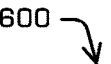
FIG. 6 illustrates an example representation of determining distances relative to an approximation of a segment, in accordance with one or more examples of the disclosure.

FIG. 6 illustrates an example representation 600 for determining distances relative to an approximation of a segment.

In this example, the example representation includes an approximation 602 that approximates a segment (e.g., between reference point 606 and reference point 608) of a reference line. The approximation 602 may be shaped as a circular arc. The representation may also include a circle 604 from which the approximation 602 is associated. The circle

604 may include a center point 610 and a radius 612 of the circle 604 extending from the center point 610 to the approximation 602. In this example, the representation may include an object 614 (e.g., point or test point) located within the circle 604. The road management component may determine how far way the object 614 is positioned from the approximation 602 by determining a first distance 616 from the center point 610 to the object 614, and subtracting the first distance 616 from known radius of the circle 604. Further, the road management component may determine a second distance 618 which may be used to determine the distance of the object 614 along the reference line. For example, the representation may include a line 620 extending from the center point 610 perpendicular to the x-axis. The road management component may use the radius 612 line and the line 620 to determine an angle 622 between the two lines, and multiply the angle 622 with the radius 612 to receive the distance 618. In such instances, the distance 618 may be used to determine a distance of a start point of the reference line to a point on the approximation perpendicular to the object 614.

Figure 7:
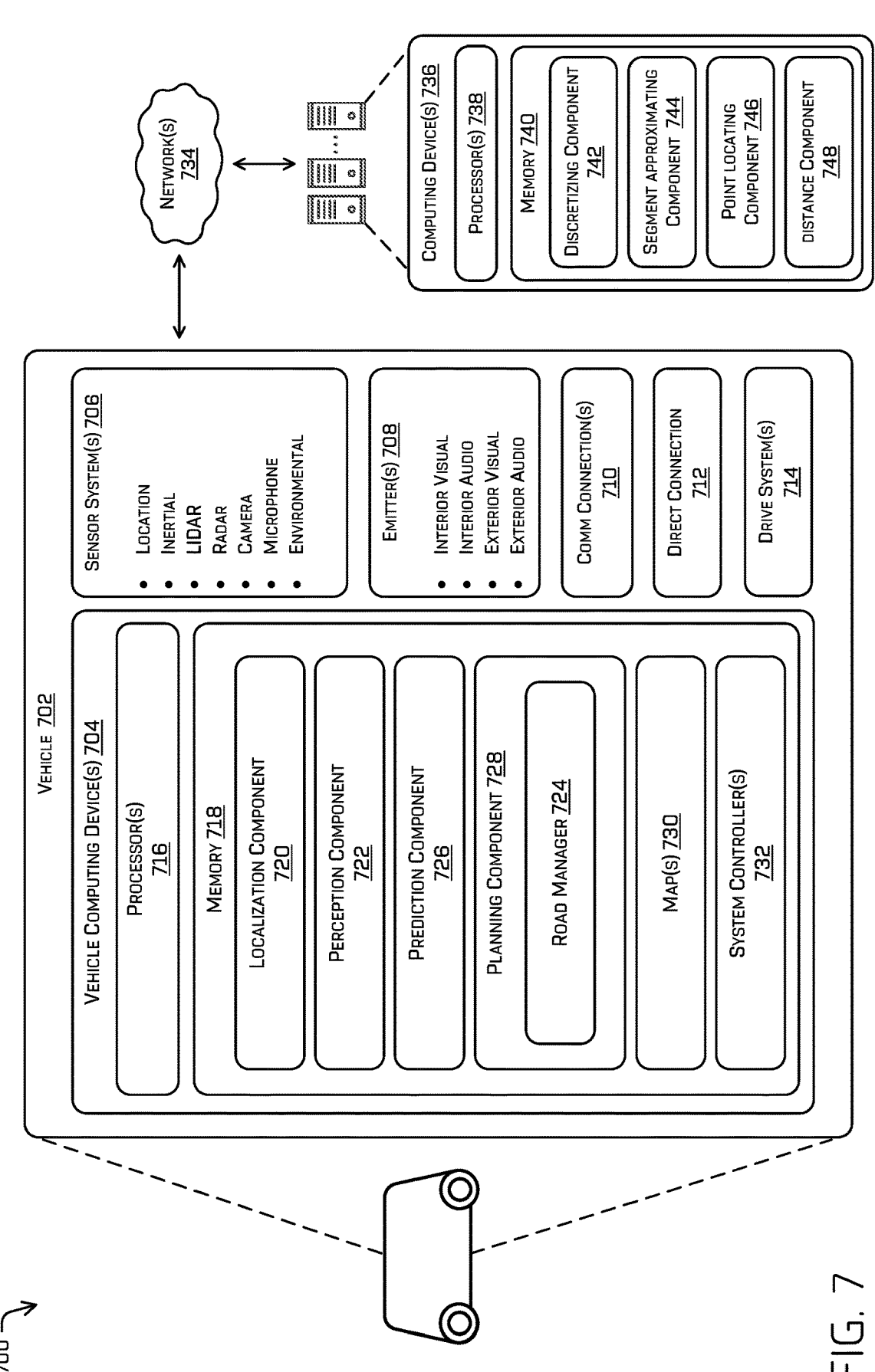
FIG. 7 depicts a block diagram of an example system for implementing various techniques described herein.

FIG. 7 is a block diagram of an example system 700 for implementing the techniques described herein. In at least one example, the system 700 may include a vehicle, such as vehicle 702. The vehicle 702 may include one or more vehicle computing devices 704, one or more sensor systems 706, one or more emitters 708, one or more communication connections 710, at least one direct connection 712, and one or more drive systems 714.

The vehicle computing device 704 may include one or more processors 716 and memory 718 communicatively coupled with the processor(s) 716. In the illustrated example, the vehicle 702 is an autonomous vehicle; however, the vehicle 702 could be any other type of vehicle, such as a semi-autonomous vehicle, or any other system having at least an image capture device (e.g., a camera-enabled smartphone). In some instances, the autonomous vehicle 702 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 702 may be a fully or partially autonomous vehicle having any other level or classification.

In the illustrated example, the memory 718 of the vehicle computing device 704 stores a localization component 720, a perception component 722, a prediction component 726, a planner component 728 including a road management component 724, one or more system controllers 732, and one or more maps 730 (or map data). Though depicted in FIG. 7 as residing in the memory 718 for illustrative purposes, it is contemplated that the localization component 720, the perception component 722, the prediction component 726, the planner component 728 including an road management component 724, system controller(s) 732, and/or the map(s) may additionally, or alternatively, be accessible to the vehicle 702 (e.g., stored on, or otherwise accessible by, memory remote from the vehicle 702, such as, for example, on memory 740 of one or more computing device 736). In some examples, the memory 740 may include a discretizing component 742, a segment approximating component 744, a point locating component 746, and a distance component 748.

In at least one example, the localization component 720 may include functionality to receive sensor data from the sensor system(s) 706 to determine a position and/or orientation of the vehicle 702 (e.g., one or more of an x-, y-, z-position, roll, pitch, or yaw). For example, the localization component 720 may include and/or request/receive a map of an environment, such as from map(s) 730, and may continuously determine a location and/or orientation of the vehicle 702 within the environment. In some instances, the localization component 720 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 702. In some instances, the localization component 720 may provide data to various components of the vehicle 702 to determine an initial position of the vehicle 702 for determining the relevance of an object to the vehicle 702, as discussed herein.

In some instances, the perception component 722 may include functionality to perform object detection, segmentation, and/or classification. In some examples, the perception component 722 may provide processed sensor data that indicates a presence of an object (e.g., entity) that is proximate to the vehicle 702 and/or a classification of the object as an object type (e.g., car, pedestrian, cyclist, animal, building, tree, road surface, curb, sidewalk, unknown, etc.). In some examples, the perception component 722 may provide processed sensor data that indicates a presence of a stationary entity that is proximate to the vehicle 702 and/or a classification of the stationary entity as a type (e.g., building, tree, road surface, curb, sidewalk, unknown, etc.). In additional or alternative examples, the perception component 722 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 726 may generate one or more probability maps representing prediction probabilities of possible locations of one or more objects in an environment. For example, the prediction component 726 may generate one or more probability maps for vehicles, pedestrians, animals, and the like within a threshold distance from the vehicle 702. In some instances, the prediction component 726 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 726 may generate predicted trajectories of objects (e.g., objects) in an environment. For example, the prediction component 726 may generate one or more predicted trajectories for objects within a threshold distance from the vehicle 702. In some examples, the prediction component 726 may measure a trace of an object and generate a trajectory for the object based on observed and predicted behavior.

In general, the planner component 728 may determine a path for the vehicle 702 to follow to traverse through an environment. For example, the planner component 728 may determine various routes and trajectories and various levels of detail. For example, the planner component 728 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 728 may generate an instruction for guiding the vehicle 702 along at least a portion of the route from the first location to the second location. In at least one example, the planner component 728 may determine how to guide the vehicle 702 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planner component 728 may select a trajectory for the vehicle 702.

In other examples, the planner component 728 may alternatively, or additionally, use data from the localization component 720, the perception component 722, and/or the prediction component 726 to determine a path for the vehicle 702 to follow to traverse through an environment. For example, the planner component 728 may receive data (e.g., object data) from the localization component 720, the perception component 722, and/or the prediction component 726 regarding objects associated with an environment. In some examples, the planner component 728 receives data for relevant objects within the environment. Using this data, the planner component 728 may determine a route to travel from a first location (e.g., a current location) to a second location (e.g., a target location) to avoid objects in an environment. In at least some examples, such a planner component 728 may determine there is no such collision-free path and, in turn, provide a path that brings vehicle 702 to a safe stop avoiding all collisions and/or otherwise mitigating damage.

The road management component 724 may be perform any of the techniques described with respect to any of FIGS. 1-6 above with respect to determining distances between points within an environment and a reference line.

In at least one example, the vehicle computing device 704 may include one or more system controllers 732, which may be configured to control steering, propulsion, braking, safety, emitters, communication, and other systems of the vehicle 702. The system controller(s) 732 may communicate with and/or control corresponding systems of the drive system(s) 714 and/or other components of the vehicle 702.

The memory 718 may further include one or more maps 730 that may be used by the vehicle 702 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 702 may be controlled based at least in part on the map(s) 730. That is, the map(s) 730 may be used in connection with the localization component 720, the perception component 722, the prediction component 726, and/or the planner component 728 to determine a location of the vehicle 702, detect objects in an environment, generate routes, determine actions and/or trajectories to navigate within an environment.

In some examples, the one or more maps 730 may be stored on a remote computing device(s) (such as the computing device(s) 736) accessible via network(s) 734. In some examples, multiple maps 730 may be stored based on, for example, a characteristic (e.g., type of entity, time of day, day of week, season of the year, etc.). Storing multiple maps 730 may have similar memory requirements, but increase the speed at which data in a map may be accessed.

In some instances, aspects of some or all of the components discussed herein may include any models, techniques, and/or machine-learned techniques. For example, in some instances, the components in the memory 718 (and the memory 740, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEiT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, top-down feature layers (e.g., see U.S. patent application Ser. No. 15/963,833, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

In at least one example, the sensor system(s) 706 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 706 may include multiple instances of each of these or other types of sensors. For instance, the lidar sensors may include individual lidar sensors located at the corners, front, back, sides, and/or top of the vehicle 702. As another example, the camera sensors may include multiple cameras disposed at various locations about the exterior and/or interior of the vehicle 702. The sensor system(s) 706 may provide input to the vehicle computing device 704. Additionally, or in the alternative, the sensor system(s) 706 may send sensor data, via the one or more networks 734, to the one or more computing device(s) 736 at a particular frequency, after a lapse of a predetermined period of time, in near real-time, etc.

The vehicle 702 may also include one or more emitters 708 for emitting light and/or sound. The emitter(s) 708 may include interior audio and visual emitters to communicate with passengers of the vehicle 702. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 708 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 702 may also include one or more communication connections 710 that enable communication between the vehicle 702 and one or more other local or remote computing device(s). For instance, the communication connection(s) 710 may facilitate communication with other local computing device(s) on the vehicle 702 and/or the drive system(s) 714. Also, the communication connection(s) 710 may allow the vehicle to communicate with other nearby computing device(s) (e.g., computing device 736, other nearby vehicles, etc.) and/or one or more remote sensor system(s) for receiving sensor data. The communications connection(s) 710 also enable the vehicle 702 to communicate with a remote teleoperations computing device or other remote services.

The communications connection(s) 710 may include physical and/or logical interfaces for connecting the vehicle computing device 704 to another computing device or a network, such as network(s) 734. For example, the communications connection(s) 710 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 may include one or more drive systems 714. In some examples, the vehicle 702 may have a single drive system 714. In at least one example, if the vehicle 702 has multiple drive systems 714, individual drive systems 714 may be positioned on opposite ends of the vehicle 702 (e.g., the front and the rear, etc.). In at least one example, the drive system(s) 714 may include one or more sensor systems to detect conditions of the drive system(s) 714 and/or the surroundings of the vehicle 702. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 714. In some cases, the sensor system(s) on the drive system(s) 714 may overlap or supplement corresponding systems of the vehicle 702 (e.g., sensor system(s) 706).

The drive system(s) 714 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 714. Furthermore, the drive system(s) 714 may also include one or more communication connection(s) that enable communication by the respective drive module with one or more other local or remote computing device(s).

In at least one example, the direct connection 712 may provide a physical interface to couple the one or more drive system(s) 714 with the body of the vehicle 702. For example, the direct connection 712 may allow the transfer of energy, fluids, air, data, etc. between the drive system(s) 714 and the vehicle. In some instances, the direct connection 712 may further releasably secure the drive system(s) 714 to the body of the vehicle 702.

In at least one example, the localization component 720, the perception component 722, the road management component 724, the prediction component 726, the planner component 728, the one or more system controllers 732, and the one or more maps 730 may process sensor data, as described above, and may send their respective outputs, over the one or more network(s) 734, to the computing device(s) 736. In at least one example, the localization component 720, the perception component 722, the road management component 724, the prediction component 726, the planner component 728, the one or more system controllers 732, and the one or more maps 730 may send their respective outputs to the computing device(s) 736 at a particular frequency, after a lapse of a predetermined period of time, in near real-time, etc.

In some examples, the vehicle 702 may send sensor data to the computing device(s) 736 via the network(s) 734. In some examples, the vehicle 702 may receive sensor data from the computing device(s) 736 and/or remote sensor system(s) via the network(s) 734. The sensor data may include raw sensor data and/or processed sensor data and/or representations of sensor data. In some examples, the sensor data (raw or processed) may be sent and/or received as one or more log files.

The computing device(s) 736 may include processor(s) 738 and a memory 740, which may include a discretizing component 742, a segment approximating component 744, a point locating component 746, and a distance component 748. In some examples, the memory 740 may store one or more of components that are similar to the component(s) stored in the memory 718 of the vehicle 702. In such examples, the computing device(s) 736 may be configured to perform one or more of the processes described herein with respect to the vehicle 702. In some examples, the discretizing component 742, the segment approximating component 744, the point locating component 746, and the distance component 748 may perform substantially similar functions as the road management component 724.

The processor(s) 716 of the vehicle 702 and the processor(s) 738 of the computing device(s) 736 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 718 and memory 740 are examples of non-transitory computer-readable media. The memory 718 and memory 740 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 7 is illustrated as a distributed system, in alternative examples, components of the vehicle 702 may be associated with the computing device(s) 736 and/or components of the computing device(s) 736 may be associated with the vehicle 702. That is, the vehicle 702 may perform one or more of the functions associated with the computing device(s) 736, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

FIG. 8 is a flow diagram illustrating an example process 800 of receiving a reference line, segmenting the reference line, approximating the segment, and using the approximation to determine distances associated with an object relative to the reference line. As described below, the example process 800 may be performed by one or more computer computer-based components configured to implement various functionalities described herein. For instance, process 800 may be performed by a road management component 202 configured approximate road segments, and use such road segment approximations to determine distances of a point relative to a reference line. As described above, the road management component 202 may be integrated as an on-vehicle system in some examples. However, in other examples, the road management component 202 may be integrated as a separate server-based system.

Process 800 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 802, the road management component may receive a reference line associated with a road segment located within an environment. A road may be represented and/or stored within map data as a reference line and/or a geometric polynomial that identifies one or more distances from the reference line to one or more borders of the road. In some instances, computing device(s) may generate the reference lines using at least line segments, circular arcs, and spirals. For example, the reference line may include one or more lines segments that include one or more lines, one or more circular arcs, and/or one or more spirals. Each reference line may include a first endpoint, such as a starting point, and a second endpoint, such as an ending point. In some examples, the reference line may be received as map data representing an environment.

At operation 804, the road management component may determine a segment of the reference line. In some examples, the road management component may break down the reference line by placing reference points at various locations along the reference line. For example, the road management component may place reference points at the start point and end point of the reference line. Further, the road management component may place reference points at locations of the reference line where two spiral sections connect, where the curvature of the reference line is approximately zero, where the border of the road changes (e.g., width, height, type, etc.), and/or any other location. A segment of the reference line may be defined by the portion of reference line between two consecutive reference points.

At operation 806, the road management component may determine an approximation of the segment. In some examples, the segment approximating component 206 may approximate the segment based on the curvature of the segment at the two reference points and/or a distance between the reference points. For example, the segment approximating component 206 may determine a curvature and/or angle of the segment at a first reference point and a curvature and/or angle of the segment at a second reference point. Further, the segment approximating component 206 may average the curvatures and/or angles to determine what size circle to use to approximate the segment.

At operation 808, the road management component may determine a value indicating a difference between the approximation and the segment. For example, the road management component may identify one or more points within the environment. Such test points may correspond to a location of the environment between the segment and the road boundaries. In some examples, the road management component may determine a first distance indicating how far along the segment the test point is positioned, and determine a second distance indicating how far away from the segment the test point is positioned (e.g., measured perpendicular to the segment). Further, the road management component may determine a third distance indicating how far along the approximation (e.g., circular arc or line) the test point is positioned, and determine a fourth distance indicating how far away from the approximation the test point is positioned (e.g., measured perpendicular to the approximation). The road management component may determine a first difference between the first distance (e.g., distance along the segment) and third distance (e.g., distance along the approximation), in addition to determining a second difference between the second (e.g., distance from the segment) and fourth distance (e.g., distance from the approximation). In some examples, the road management component may determine that the error between the segment and the approximation for the test point is the larger of the first or second differences. For example, the road management component may indicate that the error is based on larger value of the first difference and the second difference. In some instances, the road management component may perform such operations to one or more additional test points of the road segment. In such instances, the road management component may determine a plurality error values for each of a plurality of test points. The road management component may identify the largest error value of the plurality of errors.

At operation 810, the road management component may determine whether the value is below a threshold error. The road management component may compare the largest error value of the plurality of errors with a threshold error. If the largest error (e.g., the value) is not below the threshold value (e.g., threshold error) (810:No), then the road management component may determine additional segments (e.g., split the segment in half) and perform similar operations of the new segments and continue splitting the segments until the largest error value of the plurality of test points is below the threshold error. At operation 812, the road management component may determine additional segments based on the segment. In such instances, the road management component may place a reference point between the two reference points that defined the previous segment. At operation 814, the road management component may determine approximations for the additional segments. The road management component may use the same or similar techniques described above to determine such approximations. At operation 816, the road management component may determine values indicating a difference between approximations and segments. In such instances, the road management component may use the same or similar techniques described above to determine the values (e.g., errors).

Conversely, if the largest error is below the threshold value (810:Yes), then the road management component may determine that the approximation of the segment is sufficiently accurate. In such instances, the segment approximating component 206 may store information about the approximation (e.g., shape, size, curvature, radius, position, etc.) with the reference line and/or segment in one or more components of the autonomous vehicle.

At operation 818, the road management component may determine a location within the environment. The road management component and/or any other component of a vehicle may receive sensor data captured by sensor devices of a vehicle traversing an environment. The vehicle may analyze such sensor data to detect objects within the environment. In some cases, the vehicle may identify an x-y coordinate representing the position of the object with respect to a global reference frame. In some examples, the road management component may determine which road(s) the object is associated with, how far along the road the object is position, and/or how far away from the road the object is positioned.

At operation 820, the road management component may determine that the location is associated with the segment. The road management component may use a slab point location technique to determine which road segment the object is close to. For example, the road management component may determine a polygon that outlines the road defined by the road segment. The road management component may determine polygons for some or all of the candidate road segments. In some examples, the road management component may input the x-y coordinate of the object into a slab point locator in addition to the multiple polygons and receive, as output, the polygon within which the object is located. As such, the road management component may identify which road segment the object is close to.

At operation 822, the road management component may determine a first distance and a second distance based on the segment. Based on identifying the road segment proximate the object, the road management component may receive and/or request the approximation information for the associated road segment. For example, the road segment may be stored within map data and/or any other database along with the information about the circular arc or straight line that approximates the road segment. As such, the road management component may retrieve the approximation information in order to determine the position of the object relative to the approximation of the road segment. For example, the road management component may determine how far along the approximation (e.g., circular arc) the object is positioned and/or how far away from the road segment approximation the object is positioned (e.g., measured perpendicular to the circular arc). In some examples, if there are multiple positions of the approximation where the object is perpendicular to the approximation, the road management component may select or otherwise determine the smaller distance.

EXAMPLE CLAUSES

A: A system comprising: one or more processors; and one or more non-transitory computer-readable media storing computer-executable instructions that, when executed, cause the one or more processors to perform operations comprising: receiving map data associated with an environment; determining, based at least in part on the map data, a cell associated with a region of the environment; receiving a reference line associated with a road located within the environment; determining an approximation of the road based at least in part on: determining a segment of the reference line; determining an initial approximation of the segment; determining a value associated with a difference between the initial approximation and the segment; and determining, based at least in part on the value being less than or equal to a threshold value, the approximation as the initial approximation; storing, based at least in part on the approximation being the initial approximation, the approximation with the cell; and transmitting the map data to be sent to a vehicle.

B: The system of paragraph A, wherein determining the value comprises: identifying a point associated with the road; determining, based at least in part on the approximation, a first set of coordinates of the point; and determining, based at least in part on the segment, a second set of coordinates of the point, wherein determining the value is based at least in part on the first set of coordinates and the second set of coordinates.

C: The system of paragraph A, wherein determining the approximation further comprises: determining the value is greater than the threshold; dividing the segment into a plurality of subsegments; determining an additional initial approximation for a subsegment of the plurality of subsegments; determining, based at least in part on the additional initial approximation, an additional value; and determining, based at least in part on the additional value being less than or equal to the threshold, the additional initial approximation as the approximation.

D: The system of paragraph A, wherein the approximation is a circular arc or a straight line.

E: The system of paragraph A, wherein the vehicle is configured to be controlled based at least in part on: receiving a location associated with the environment; determining that the location is associated with the segment; determining based at least in part on the location being associated with the segment, a first distance relative to the approximation and a second distance relative to the approximation; generating a trajectory based at least in part on the first and second distance; and following the trajectory.

F: One or more non-transitory computer-readable media storing instructions executable by one or more processors, wherein the instructions, when executed, cause the one or more processors to perform operations comprising: receiving a reference line associated with a road located within an environment; determining a segment of the reference line; determining an approximation of the segment; determining a value indicating a difference between the approximation and the segment; determining that the value is below a threshold value; and storing, based at least in part on the value being below the threshold value, the approximation in map data.

G: The one or more non-transitory computer-readable media of paragraph F, wherein determining the value comprises: identifying a point in the environment proximate the road; determining, based at least in part on the approximation, a first set of coordinates of the point; and determining, based at least in part on the segment, a second set of coordinates of the point, wherein determining the value is based at least in part on the first set of coordinates and second set of coordinates.

H: The one or more non-transitory computer-readable media of paragraph F, wherein determining the approximation further comprises: determining the value is greater than the threshold; dividing the segment into a plurality of subsegments; determining an additional initial approximation for a subsegment of the plurality of subsegments; determining, based at least in part on the additional initial approximation, an additional value; and determining, based at least in part on the additional value being less than or equal to the threshold, the additional initial approximation as the approximation.

I: The one or more non-transitory computer-readable media of paragraph F, wherein the approximation is a circular arc or a straight line.

J: The one or more non-transitory computer-readable media of paragraph F, the operations further comprising: causing the map data to be sent to a vehicle configured to be controlled based at least in part on the map data.

K: The one or more non-transitory computer-readable media of paragraph J, wherein the vehicle is configured to be controlled based at least in part on: receiving a location associated with the environment; determining, based at least in part on the map data, that the location is associated with the segment; and determining, based at least in part on the location being associated with the segment, a first distance relative to the approximation and a second distance relative to the approximation.

L: The one or more non-transitory computer-readable media of paragraph K, wherein determining that the location is associated with the segment is based at least in part on: determining, based at least in part on the map data, a cell associated with a region of the environment; and determining that the location is within the cell.

M: The one or more non-transitory computer-readable media of paragraph K, wherein the first distance and the second distance are in a route-relative reference frame.

N: A method comprising: receiving a reference line associated with a road located within an environment; determining a segment of the reference line; determining an approximation of the segment; determining a value indicating a difference between the approximation and the segment; determining that the value is below a threshold value; and storing, based at least in part on the value being below the threshold value, the approximation in map data.

O: The method of paragraph N, wherein determining the value comprises: identifying a point in the environment proximate the road; determining, based at least in part on the approximation, a first set of coordinates of the point; and determining, based at least in part on the segment, a second set of coordinates of the point, wherein determining the value is based at least in part on the first set of coordinates and second set of coordinates.

P: The method of paragraph N, wherein determining the approximation further comprises: determining the value is greater than the threshold; dividing the segment into a plurality of subsegments; determining an additional initial approximation for a subsegment of the plurality of subsegments; determining, based at least in part on the additional initial approximation, an additional value; and determining, based at least in part on the additional value being less than or equal to the threshold, the additional initial approximation as the approximation.

Q: The method of paragraph N, wherein the approximation is a circular arc or a straight line.

R: The method of paragraph N, further comprising: causing the map data to be sent to a vehicle configured to be controlled based at least in part on the map data.

S: The method of paragraph R, wherein the vehicle is configured to be controlled based at least in part on: receiving a location associated with the environment; determining, based at least in part on the map data, that the location is associated with the segment; and determining, based at least in part on the location being associated with the segment, a first distance relative to the approximation and a second distance relative to the approximation.

T: The method of paragraph S, wherein the first distance and the second distance are in a route-relative reference frame.

U: A system comprising: one or more processors; and one or more non-transitory computer-readable media storing computer-executable instructions that, when executed, cause the one or more processors to perform operations comprising: receiving, from a sensor device associated with a vehicle, sensor data associated with an environment; detecting, based at least in part on the sensor data, an object in the environment; determining a location of an object within the environment, the location being defined in a first coordinate system; determining, based at least in part on the location, that the object is located within a cell of discretized map data; receiving a candidate road associated with the cell, wherein the candidate road includes a segment; determining that the object is associated with the segment; receiving, from the cell and based at least in part on determining that the object is associated with the segment, an approximation of the segment; determining, as a set of coordinates in a second coordinate system, a first distance relative to object from the approximation and a second distance of the object relative to the approximation; and controlling the vehicle based at least in part on the first distance and the second distance.

V: The system of paragraph U, wherein the first distance indicates a measurement of the object along the candidate road, the candidate road being represented as a reference line, wherein determining the first distance comprises: identifying a start point of the reference line; identifying a second segment of the reference line between the start point and the segment, wherein the second segment is associated with a second approximation; and determining, based at least in part on a sum of the second approximation and at least a portion of the approximation, the first distance.

W: The system of paragraph U, wherein second coordinate system is a route-relative reference frame.

X: The system of paragraph U, the operations further comprising: receiving a second candidate road associated with the cell, wherein the second candidate road includes a second segment and a second approximation; determining that the object is associated with the second segment; determining a third distance relative to the second approximation and a fourth distance relative to the second approximation; and controlling the vehicle based at least in part on the first, second, third, and fourth distances.

Y: The system of paragraph U, wherein the discretized map data is determined based at least in part on generating a plurality of cells associated with the map data, the cell being associated with the plurality of cells, wherein the cell includes a cell identifier associated with a candidate road identifier of the candidate road.

Z: One or more non-transitory computer-readable media storing instructions executable by one or more processors, wherein the instructions, when executed, cause the one or more processors to perform operations comprising: receiving sensor data associated with an environment; detecting, based at least in part on the sensor data, an object in the environment; determining a location of an object within the environment; determining, based at least in part on the location, that the object is located within a cell of discretized map data; receiving a candidate road associated with the cell, wherein the candidate road includes a segment; determining that the object is associated with the segment; receiving, from the cell and based at least in part on the object being associated with the segment, an approximation of the segment; and determining a first distance relative to the approximation and a second distance relative to the approximation.

AA: The one or more non-transitory computer-readable media of paragraph Z, wherein the first distance indicates a measurement of the object along the candidate road, the candidate road being represented as a reference line, wherein determining the first distance comprises: identifying a start point of the reference line; identifying a second segment of the reference line between the start point and the segment, wherein the second segment is associated with a second approximation; and determining, based at least in part on a sum of the second approximation and at least a portion of the approximation, the first distance.

AB: The one or more non-transitory computer-readable media of paragraph Z, wherein the first distance and the second distance are in a route-relative coordinate system and the location is in a Cartesian coordinate system.

AC: The one or more non-transitory computer-readable media of paragraph Z, the operations further comprising: receiving a second candidate road associated with the cell, wherein the second candidate road includes a second segment and a second approximation; determining that the object is associated with the second segment; determining a third distance relative to the second approximation and a fourth distance relative to the second approximation; and controlling a vehicle based at least in part on the first, second, third, and fourth distances.

AD: The one or more non-transitory computer-readable media of paragraph Z, wherein the discretized map data is determined based at least in part on generating a plurality of cells associated with the map data, the cell being associated with the plurality of cells, wherein the cell includes a cell identifier associated with a candidate road identifier of the candidate road.

AE: The one or more non-transitory computer-readable media of paragraph Z, wherein the approximation is determined based at least in part on: receiving a reference line associated with the candidate road; determining a value associated with a difference between the approximation and the segment; and determining that the value is less than or equal to a threshold value.

AF: The one or more non-transitory computer-readable media of paragraph AE, wherein determining the approximation further comprises: determining the value is greater than the threshold; dividing the segment into a plurality of subsegments; determining a second approximation for a subsegment of the plurality of subsegments; determining, based at least in part on the second approximation, a second value; and determining that the second value is less than or equal to the threshold value.

AG: The one or more non-transitory computer-readable media of paragraph Z, the operations further comprising: controlling a vehicle based at least in part on the first distance and the second distance.

AH: A method comprising: receiving sensor data associated with an environment; detecting, based at least in part on the sensor data, an object in the environment; determining a location of an object within the environment; determining, based at least in part on the location, that the object is located within a cell of discretized map data; receiving a candidate road associated with the cell, wherein the candidate road includes a segment; determining that the object is associated with the segment; receiving, from the cell and based at least in part on the object being associated with the segment, an approximation of the segment; and determining a first distance relative to the approximation and a second distance relative to the approximation.

AI: The method of paragraph AH, wherein the first distance indicates a measurement of the object along the candidate road, the candidate road being represented as a reference line, wherein determining the first distance comprises: identifying a start point of the reference line; identifying a second segment of the reference line between the start point and the segment, wherein the second segment is associated with a second approximation; and determining, based at least in part on a sum of the second approximation and at least a portion of the approximation, the first distance.

AJ: The method of paragraph AH, wherein the first distance and the second distance are in a route-relative coordinate system and the location is in a Cartesian coordinate system.

AK: The method of paragraph AH, further comprising: receiving a second candidate road associated with the cell, wherein the second candidate road includes a second segment and a second approximation; determining that the object is associated with the second segment; determining a third distance relative to the second approximation and a fourth distance relative to the second approximation; and controlling a vehicle based at least in part on the first, second, third, and fourth distances.

AL: The method of paragraph AH, wherein the discretized map data is determined based at least in part on generating a plurality of cells associated with the map data, the cell being associated with the plurality of cells, wherein the cell includes a cell identifier associated with a candidate road identifier of the candidate road.

AM: The method of paragraph AH, wherein the approximation is determined based at least in part on: receiving a reference line associated with the candidate road; determining a value associated with a difference between the approximation and the segment; and determining that the value is less than or equal to a threshold value.

AN: The method of paragraph AM, wherein determining the approximation further comprises: determining the value is greater than the threshold; dividing the segment into a plurality of subsegments; determining a second approximation for a subsegment of the plurality of subsegments; determining, based at least in part on the second approximation, a second value; and determining that the second value is less than or equal to the threshold value.

While the example clauses described above are described with respect to particular implementations, it should be understood that, in the context of this document, the content of the example clauses can be implemented via a method, device, system, a computer-readable medium, and/or another implementation. Additionally, any of examples A-AN may be implemented alone or in combination with any other one or more of the examples A-AN.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

one or more processors; and one or more non-transitory computer-readable media storing computer-executable instructions that, when executed, cause the one or more processors to perform operations comprising:

receiving, from a sensor device associated with a vehicle, sensor data associated with an environment;

detecting, based at least in part on the sensor data, an object in the environment;

determining a location of the object within the environment, the location being defined in a first coordinate system;

determining, based at least in part on the location, that the object is located within a cell of discretized map data;

receiving a candidate road associated with the cell, wherein the candidate road includes a segment;

determining that the object is associated with the segment;

receiving, from the cell and based at least in part on determining that the object is associated with the segment, an approximation of the segment, wherein the approximation is determined at a previous time;

determining, as a set of coordinates in a second coordinate system, a first distance relative to the object from a first point along the approximation and a second distance of the object relative to a second point along the approximation; and controlling the vehicle based at least in part on the first distance and the second distance.

2. The system of claim 1, wherein the first distance indicates a measurement of the object along the candidate road, the candidate road being represented as a reference line, wherein determining the first distance comprises:

identifying a start point of the reference line;

identifying a second segment of the reference line between the start point and the segment, wherein the second segment is associated with a second approximation; and determining, based at least in part on a sum of a first length the second approximation and at least a portion of a second length of the approximation, the first distance.

3. The system of claim 1, wherein the second coordinate system is a relative reference frame.

4. The system of claim 1, the operations further comprising:

receiving a second candidate road associated with the cell, wherein the second candidate road includes a second segment and a second approximation;

determining that the object is associated with the second segment;

determining a third distance relative to the object from a third point along the second approximation and a fourth distance of the object relative to a fourth point along the second approximation; and controlling the vehicle based at least in part on the first distance, the second distance, the third distance, and the fourth distance.

5. The system of claim 1, wherein the discretized map data is determined based at least in part on generating a plurality of cells associated with map data, the cell being associated with the plurality of cells, wherein the cell includes a cell identifier associated with a candidate road identifier of the candidate road.

6. One or more non transitory computer readable media storing instructions executable by one or more processors, wherein the instructions, when executed, cause the one or more processors to perform operations comprising:

receiving sensor data associated with an environment;

detecting, based at least in part on the sensor data, an object in the environment;

determining a location of the object within the environment;

determining, based at least in part on the location, that the object is located within a cell of discretized map data;

receiving a candidate road associated with the cell, wherein the candidate road includes a segment;

determining that the object is associated with the segment;

receiving, from the cell and based at least in part on the object being associated with the segment, an approximation of the segment, wherein the approximation is determined at a previous time;

determining a first distance relative to the object from a first point along the approximation and a second distance of the object relative to a second point along the approximation; and controlling a vehicle based at least in part on the first distance and the second distance.

7. The system of claim 1, wherein the approximation is determined by a remote system and stored in the cell.

8. The one or more non transitory computer readable media of claim 6, wherein the first distance indicates a measurement of the object along the candidate road, the candidate road being represented as a reference line, wherein determining the first distance comprises:

identifying a start point of the reference line;

identifying a second segment of the reference line between the start point and the segment, wherein the second segment is associated with a second approximation; and determining, based at least in part on a sum of a first length of the second approximation and at least a portion of a second length of the approximation, the first distance.

9. The one or more non transitory computer readable media of claim 6, wherein the first distance and the second distance are in a relative coordinate system and the location is in a Cartesian coordinate system.

10. The one or more non transitory computer readable media of claim 6, the operations further comprising:

receiving a second candidate road associated with the cell, wherein the second candidate road includes a second segment and a second approximation;

determining that the object is associated with the second segment;

determining a third distance relative to the object from a third point along the second approximation and a fourth distance of the object relative to a fourth point along the second approximation; and controlling the vehicle based at least in part on the first distance, the second distance, the third distance, and the fourth distance.

11. The one or more non transitory computer readable media of claim 6, wherein the discretized map data is determined based at least in part on generating a plurality of cells associated with map data, the cell being associated with the plurality of cells, wherein the cell includes a cell identifier associated with a candidate road identifier of the candidate road.

12. The one or more non transitory computer readable media of claim 6, wherein the approximation is determined based at least in part on:

receiving a reference line associated with the candidate road;

determining a value associated with a difference between the approximation and the segment; and determining that the value is less than or equal to a threshold value.

13. The one or more non transitory computer readable media of claim 12, wherein determining the approximation further comprises:

determining the value is greater than the threshold value;

dividing the segment into a plurality of subsegments;

determining a second approximation for a subsegment of the plurality of subsegments;

determining, based at least in part on the second approximation, a second value; and determining that the second value is less than or equal to the threshold value.

14. A method comprising:

receiving sensor data associated with an environment;

detecting, based at least in part on the sensor data, an object in the environment;

determining a location of the object within the environment;

determining, based at least in part on the location, that the object is located within a cell of discretized map data;

receiving a candidate road associated with the cell, wherein the candidate road includes a segment;

determining that the object is associated with the segment;

receiving, from the cell and based at least in part on the object being associated with the segment, an approximation of the segment, wherein the approximation is determined at a previous time;

determining a first distance relative to the object from a first point along the approximation and a second distance of the object relative to a second point the approximation; and controlling a vehicle based at least in part on the first distance and the second distance.

15. The method of claim 14, wherein the first distance indicates a measurement of the object along the candidate road, the candidate road being represented as a reference line, wherein determining the first distance comprises:

identifying a start point of the reference line;

identifying a second segment of the reference line between the start point and the segment, wherein the second segment is associated with a second approximation; and determining, based at least in part on a sum of a first length of the second approximation and at least a portion of a second length of the approximation, the first distance.

16. The method of claim 14, wherein the first distance and the second distance are in a relative coordinate system and the location is in a Cartesian coordinate system.

17. The method of claim 14, further comprising:

receiving a second candidate road associated with the cell, wherein the second candidate road includes a second segment and a second approximation;

determining that the object is associated with the second segment;

determining a third distance relative to the object from a third point along the second approximation and a fourth distance of the object relative to a fourth point along the second approximation; and controlling the vehicle based at least in part on the first distance, the second distance, the third distance, and the fourth distance.

18. The method of claim 14, wherein the discretized map data is determined based at least in part on generating a plurality of cells associated with map data, the cell being associated with the plurality of cells, wherein the cell includes a cell identifier associated with a candidate road identifier of the candidate road.

19. The method of claim 14, wherein the approximation is determined based at least in part on:

receiving a reference line associated with the candidate road;

determining a value associated with a difference between the approximation and the segment; and determining that the value is less than or equal to a threshold value.

20. The method of claim 19, wherein determining the approximation further comprises:

determining the value is greater than the threshold value;

dividing the segment into a plurality of subsegments;

determining a second approximation for a subsegment of the plurality of subsegments;

determining, based at least in part on the second approximation, a second value; and determining that the second value is less than or equal to the threshold value.

* * * * *